United States Patent
Hanafusa et al.

(10) Patent No.: US 10,351,184 B2
(45) Date of Patent: Jul. 16, 2019

(54) WORK VEHICLE

(71) Applicant: YANMAR CO., LTD., Osaka-shi, Osaka (JP)

(72) Inventors: Masahiro Hanafusa, Osaka (JP); Taihei Daiyakuji, Osaka (JP); Terunobu Yoshioka, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 15/024,468

(22) PCT Filed: Sep. 29, 2014

(86) PCT No.: PCT/JP2014/075956
§ 371 (c)(1),
(2) Date: Mar. 24, 2016

(87) PCT Pub. No.: WO2015/046536
PCT Pub. Date: Apr. 2, 2015

(65) Prior Publication Data
US 2016/0236730 A1 Aug. 18, 2016

(30) Foreign Application Priority Data

Sep. 30, 2013 (JP) .................. 2013-204703
Sep. 30, 2013 (JP) .................. 2013-204704
Sep. 30, 2013 (JP) .................. 2013-204706

(51) Int. Cl.
  *B62D 49/06* (2006.01)
  *B62D 21/18* (2006.01)
  (Continued)

(52) U.S. Cl.
  CPC .......... *B62D 49/06* (2013.01); *B60K 17/00* (2013.01); *B62D 21/186* (2013.01); *B62D 49/04* (2013.01);
  (Continued)

(58) Field of Classification Search
  CPC .... B62D 49/06; B62D 49/085; B62D 21/186; B62D 49/04; B60K 17/00; B60Y 2200/221
  See application file for complete search history.

(56) References Cited

U.S. PATENT DOCUMENTS 2,561,114 A * 7/1951 Hardin, Jr. ............. B62D 49/04
                                                    280/149.1
3,214,192 A * 10/1965 Hamm ................... B62D 49/04
                                                    180/9.4
(Continued)

FOREIGN PATENT DOCUMENTS

JP  S52103521 U  8/1977
JP  S5774879 U   5/1982
(Continued)

OTHER PUBLICATIONS

International Search Report corresponding to Application No. PCT/JP2014/075956; dated Dec. 9, 2014, with English translation.
(Continued)

*Primary Examiner* — Paul N Dickson
*Assistant Examiner* — Timothy Wilhelm
(74) *Attorney, Agent, or Firm* — Norton Rose Fulbright US LLP

(57) ABSTRACT

A working vehicle where a front axle case is supported by two front axle brackets includes a body flame formed by disposing beams at a prescribed interval, by welding reinforced plates to plate faces of the beams which face to each other, and by welding both end parts of one of the front axle brackets to the reinforced plates; and a front hitch formed by welding both end parts of the other front axle bracket to both end parts of a plate member which are bent. The front hitch is attached to the body flame such that the two front axle brackets are opposed to each other.

12 Claims, 29 Drawing Sheets

(51) Int. Cl.
*B62D 49/04* (2006.01)
*B60K 17/00* (2006.01)
*B62D 49/08* (2006.01)

(52) U.S. Cl.
CPC ...... *B62D 49/085* (2013.01); *B60Y 2200/221* (2013.01)

(56) References Cited

U.S. PATENT DOCUMENTS

| | | | | |
|---|---|---|---|---|
| 3,749,180 | A * | 7/1973 | Coontz | B62D 49/04 172/308 |
| 4,106,795 | A * | 8/1978 | Henning | B62D 49/04 172/834 |
| 4,787,811 | A * | 11/1988 | Langenfeld | E02F 3/3618 172/272 |
| 4,969,533 | A | 11/1990 | Holm et al. | |
| 6,729,431 | B2 * | 5/2004 | Osuga | B62D 21/186 180/312 |
| 6,732,811 | B1 * | 5/2004 | Elliott | E01H 5/06 172/445.1 |
| 6,860,039 | B2 * | 3/2005 | Schultz | E01H 5/063 172/273 |
| 7,001,134 | B2 * | 2/2006 | Aoki | B62D 49/04 172/272 |
| 7,036,622 | B2 * | 5/2006 | Iwaki | B62D 49/02 180/311 |
| 7,146,754 | B2 * | 12/2006 | Schultz | E01H 5/063 37/231 |
| 7,171,769 | B2 * | 2/2007 | Schultz | B60D 1/36 172/272 |
| 7,240,759 | B2 * | 7/2007 | Uemura | B60B 35/001 180/343 |
| 7,290,637 | B2 * | 11/2007 | Nagata | B60K 17/303 180/417 |
| 7,396,201 | B2 * | 7/2008 | Pollnow | B60P 1/025 414/482 |
| 7,661,210 | B2 * | 2/2010 | Shepherd | E01H 5/06 172/396 |
| 7,721,866 | B2 * | 5/2010 | Kawashiri | B60K 20/04 192/220.1 |
| 7,818,903 | B2 * | 10/2010 | Elliot | A01B 59/064 172/445.1 |
| 7,832,519 | B2 * | 11/2010 | Sakamoto | B62D 21/186 180/312 |
| 8,312,955 | B2 * | 11/2012 | Kawashiri | B62D 21/186 180/312 |
| 2002/0059790 | A1 * | 5/2002 | Paulsen | A01D 78/001 56/377 |
| 2006/0005435 | A1 * | 1/2006 | Gamble, II | E01H 5/065 37/281 |
| 2006/0201980 | A1 * | 9/2006 | Koons | B60D 1/07 224/511 |
| 2010/0060015 | A1 | 3/2010 | Buker | |
| 2011/0180282 | A1 * | 7/2011 | Reavie | B62D 49/04 172/273 |
| 2016/0272240 | A1 * | 9/2016 | Hanafusa | B62D 9/00 |

FOREIGN PATENT DOCUMENTS

| | | | |
|---|---|---|---|
| JP | S61-188277 | A | 8/1986 |
| JP | 63015728 | U | 2/1988 |
| JP | 01-125818 | U | 8/1989 |
| JP | 01-174535 | U | 12/1989 |
| JP | 2004-003706 | A | 1/2004 |
| JP | 2008063833 | A | 3/2008 |
| JP | 2008106451 | A | 5/2008 |
| JP | 2012126145 | A * | 7/2012 |
| JP | 2012126146 | A | 7/2012 |
| JP | 2012126147 | A | 7/2012 |
| JP | 2013-537275 | A | 9/2013 |
| WO | 2006/077773 | A1 | 7/2006 |

OTHER PUBLICATIONS

Partial English translation of JPS52-103521U1, Publication date: Aug. 6, 1977.
Partial English translation of JPS57-074879U1, Publication date: May 8, 1982.
Japanese Office Action dated 2017-09-19 issued in corresponding Japanese Application No. 2015-041870 cites the patent documents above.
European Search Report dated 2017-05-04 issued in corresponding European Application No. 14848418.1 cites the patent documents above.

* cited by examiner

WORK VEHICLE

CROSS REFERENCE TO RELATED APPLICATIONS

This is the U.S. national stage of application No. PCT/JP2014/075956, filed on Sep. 29, 2014. Priority under 35 U.S.C. § 119(a) and 35 U.S.C. § 365(b) is claimed from Japanese Application Nos. 2013-204704; 2013-204703; 2013-204706, each filed Sep. 30, 2013, the disclosures of which are also incorporated herein by reference.

TECHNICAL FIELD

The present invention relates to a working vehicle where a front axle case is supported by two front axle brackets.

BACKGROUND ART

A front axle case disposed on a working vehicle such as a tractor is supported by two front axle brackets. Two front axle brackets are attached to the front part of a body frame as with a working vehicle disclosed in JP 2012-126145 A, for example.

In the working vehicle disclosed in JP 2012-126145 A, a plurality of bolts are screwed in a plurality of fixing holes provided in the front part of a body frame and in a plurality of attaching holes opened at the right and the left ends of a front axle bracket, so that the front axle bracket is attached to the body frame.

In the working vehicle disclosed in JP 2012-126145 A, a plurality of bolts are screwed in a plurality of attaching holes provided in front of the fixing holes of the body frame and in a plurality of attaching hole formed in a front hitch, so that the front hitch is attached to the body frame.

In the working vehicle disclosed in JP 2012-126145 A, parts including the front axle bracket are separately attached to the body frame with bolts, so that a large number of bolts are required. For this reason, the working vehicle disclosed in JP 2012-126145 A requires a large number of parts.

In the working vehicle disclosed in JP 2012-126145 A, separate parts including the body frame, the front axle bracket and the front hitch are fastened with bolts, so that rigidity of the body frame may not be sufficiently secured when fastening force of the bolts varies.

CITATION LIST

Patent Literature

PTL1: JP 2012-126145 A

SUMMARY OF INVENTION

Technical Problem

The invention has been made in consideration of the above-mentioned conditions. The object of the present invention is to provide a working vehicle capable of decreasing the number of parts and securing rigidity of a body frame.

Solution to Problem

A working vehicle where a front axle case is supported by two front axle brackets includes a body frame formed by disposing beams at a prescribed interval, by welding reinforced plates to plate faces of the beams which face to each other, and by welding both end parts of one of the front axle brackets to the reinforced plates; and a front hitch formed by welding both end parts of the other front axle bracket to both end parts of a plate member which are bent. The front hitch is attached to the body frame such that the two front axle brackets are opposed to each other.

Preferably, end parts of the reinforced plates are extended to an end part of the body frame, and the front hitch is attached to the body frame through extended end parts of the reinforced plates.

Preferably, a transmission case is fixed on the inside of the beams, by first pins and second pins, which are disposed at a prescribed interval, a first attaching hole where the first pin is closely inserted and a second attaching hole where the second pin is loosely inserted are formed on each of the beams, the first pin inserted into the first attaching hole is fixed to the transmission case, and the second pin inserted into the second attaching hole is fixed to the transmission case and each of the beams.

Preferably, the second attaching hole is formed in a circular arc shape centered about the first pin.

Advantageous Effects of Invention

The present invention provides the following effects.

The present invention makes it possible to decrease the number of parts and to secure rigidity of a body frame.

The present invention makes it possible to suppress deterioration in shape accuracy of the body frame and to surely secure rigidity of the end part of the body frame.

The present invention makes it possible to absorb shape error of the body frame.

The present invention makes it possible to absorb the shape error of the body frame effectively.

BRIEF DESCRIPTION OF DRAWINGS

FIG. 2 shows a front axle case, in which

FIG. 11 shows a transmission case, in which

FIG. 14 shows a state where a first pin is inserted into the transmission case, in which

FIG. 15 shows a state where a second pin is inserted into the transmission case, in which

FIG. 16 shows a state where a second pin is fixed, in which

FIG. 25 shows a state where a first space is formed, in which

FIG. 26 shows a state where a second space is formed, in which

FIG. 27 shows a state where insertion operation of the shaft part of the front axle case is finished, in which

FIG. 28 is a sectional front view showing a variation of the notch, in which

FIG. 29 shows a front axle case having the shaft part where a hole is formed, in which

DESCRIPTION OF EMBODIMENTS

An embodiment according to the present invention is described.

First, the whole configuration of a working vehicle 1 as the present embodiment according to the present invention is described.

The working vehicle 1 of the present embodiment is a tractor. However, the working vehicle 1 according to the present invention is not limited to the tractor.

Figure 1:
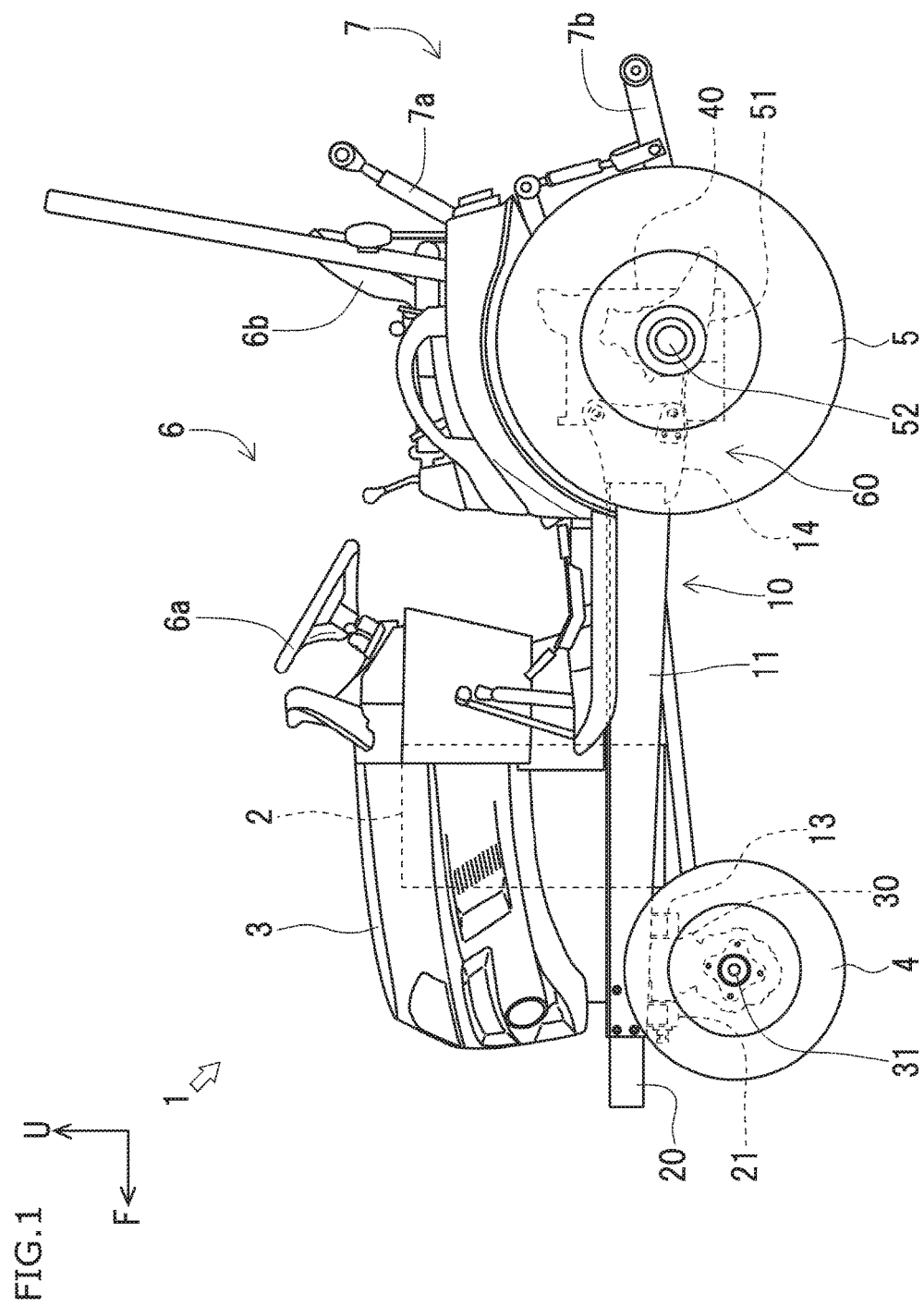
FIG. 1 is a side view showing a whole configuration of a working vehicle as an embodiment according to the present invention

Hereinafter, a longitudinal direction of the working vehicle 1 is defined such that the direction of the arrow F shown in FIG. 1 is the forward direction.

Hereinafter, a vertical direction of the working vehicle 1 is defined such that the direction of the arrow U shown in FIG. 1 is the upper direction.

Figure 2B:
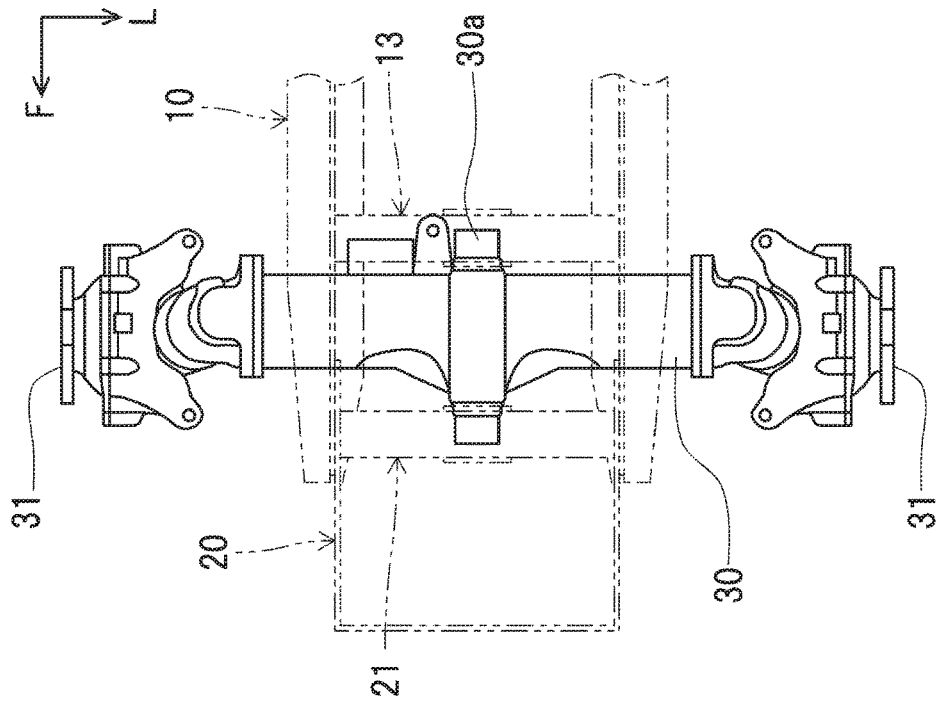
FIG. 2(a) is a side view and FIG. 2(b) is a plan view.

Hereinafter, a transverse direction of the working vehicle 1 is defined such that the direction of the arrow L shown in FIG. 2(b) is the left direction.

As shown in FIG. 1, in the working vehicle 1, a body frame 10 is disposed such that a longitudinal direction thereof is parallel to the longitudinal direction of the working vehicle 1.

The body frame 10 supports an engine 2 through an engine bracket at the front part thereof. The engine 2 and so on are covered with a hood 3.

The front part of the body frame 10 is supported by a pair of front wheels 4 through a front axle case 30. The rear part of the body frame 10 is supported by a pair of rear wheels 5 through a transmission case 40 and a rear axle case 51.

A driving operation part 6 is disposed on the upper part of the body frame 10. The driving operation part 6 includes a steering handle 6a and a seat 6b.

The steering handle 6a is configured that the working vehicle 1 can be steered by changing the steering angle of the pair of front wheels 4 depending on the rotating operation amount of the steering handle 6a. The seat 6b is disposed above the pair of rear wheels 5 such that a driver can seat the seat 6b.

A work machine attaching device 7 is disposed on the rear part of the driving operation part 6. In the work machine attaching device 7, a work machine such as a rotary tilling device is attached to the rear end part of the working vehicle 1 by connecting the work machine to the rear end of a top link 7a and the rear end of a lower link 7b.

In the working vehicle 1, a front hitch 20 having a weight is attached to the front end of the body frame 10 to correct weight unbalance in the longitudinal direction caused by attaching the work machine.

Figure 2A:
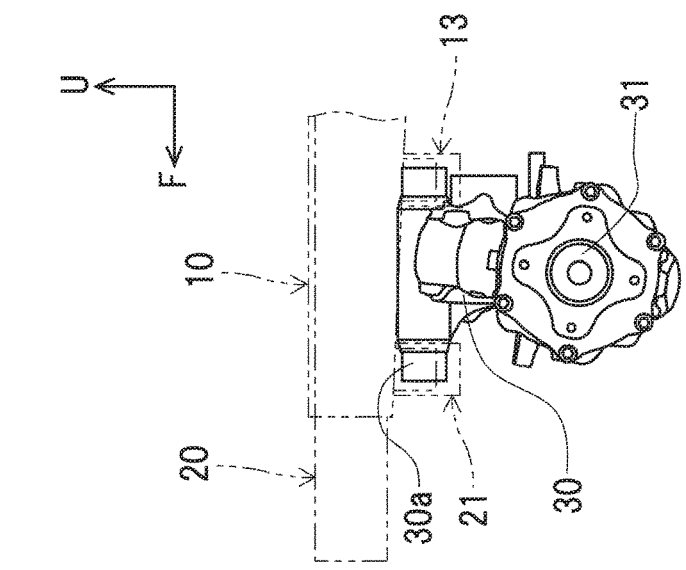

As shown in FIGS. 1 and 2, the front axle case 30 is attached to the front part of the body frame 10.

The front axle case 30 is a hollow member, and is disposed such that a longitudinal direction thereof is parallel to the transverse direction of the working vehicle 1. A shaft part 30a projects in the longitudinal direction in the middle part of the front axle case 30 in the transverse direction.

The pair of front wheels 4 is attached to both right and left sides of the front axle case 30 through a pair of front axles 31.

The front axle case 30 is supported by a front axle bracket 13 of the body frame 10 and a front axle bracket 21 of the front hitch 20. Details of the front axle bracket 13 and the front axle bracket 21 are mentioned later.

As shown FIG. 1, the transmission case 40 where a transmission device is installed is attached to the rear part of the body frame 10 through a transmission case attaching part 60.

The top link 7a of the work machine attaching device 7 is rotatably connected to the rear part of the transmission case 40.

Details of the transmission case attaching part 60 are mentioned later.

Figure 11A:
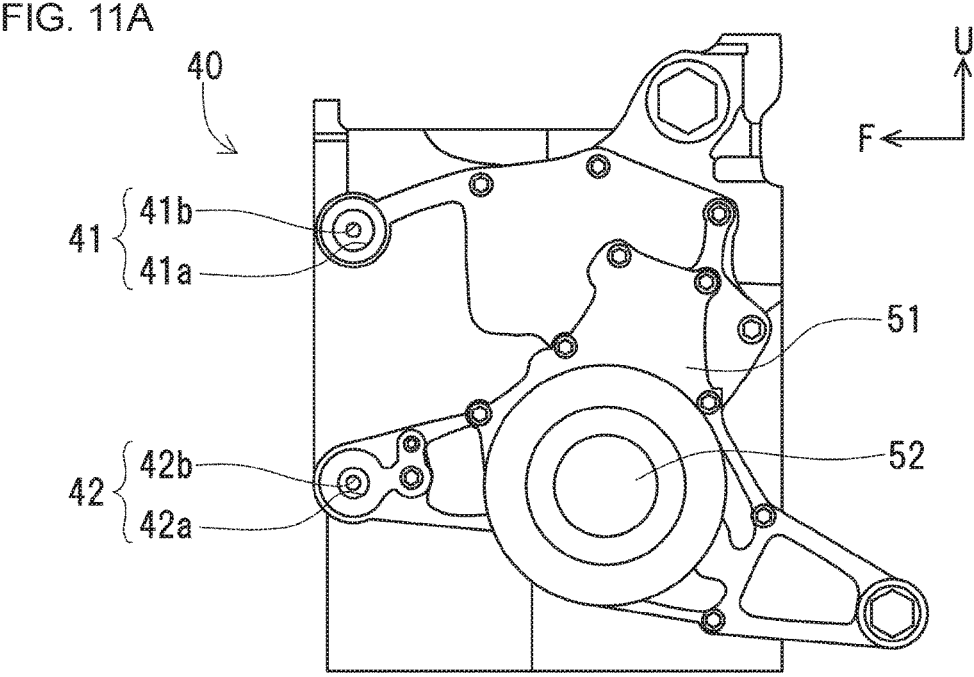
FIG. 11(a) is a side view and FIG. 11(b) is a sectional view showing a first attaching part and a second attaching part.

The transmission case 40 supports a pair of rear axle cases 51 on both right and left faces thereof (see FIG. 11(a)).

The pair of rear wheels 5 are attached to the pair of rear axle cases 51 through a pair of rear axles 52.

The lower link 7b of the work machine attaching device 7 is rotatably connected to the transmission case 40 or the pair of rear axle cases 51.

The working vehicle 1 is configured such that after changing the power of the engine 2 by the transmission device, the changed power of the engine 2 can be transmitted to the pair of front wheels 4 through the pair of front axles 31 and to the pair of rear wheels 5 through the pair of rear axles 52.

The power of the engine 2 is transmitted to the pair of front wheels 4 and the pair of rear wheels 5. The working vehicle 1 travels by rotatably driving the pair of front wheels 4 and the pair of rear wheels 5.

The working vehicle 1 is configured such that the power of the engine 2 changed by the transmission device can also be transmitted to the work machine. Thereby, the working vehicle 1 drives the work machine.

The configuration of the body frame 10 is described.

Figure 3:
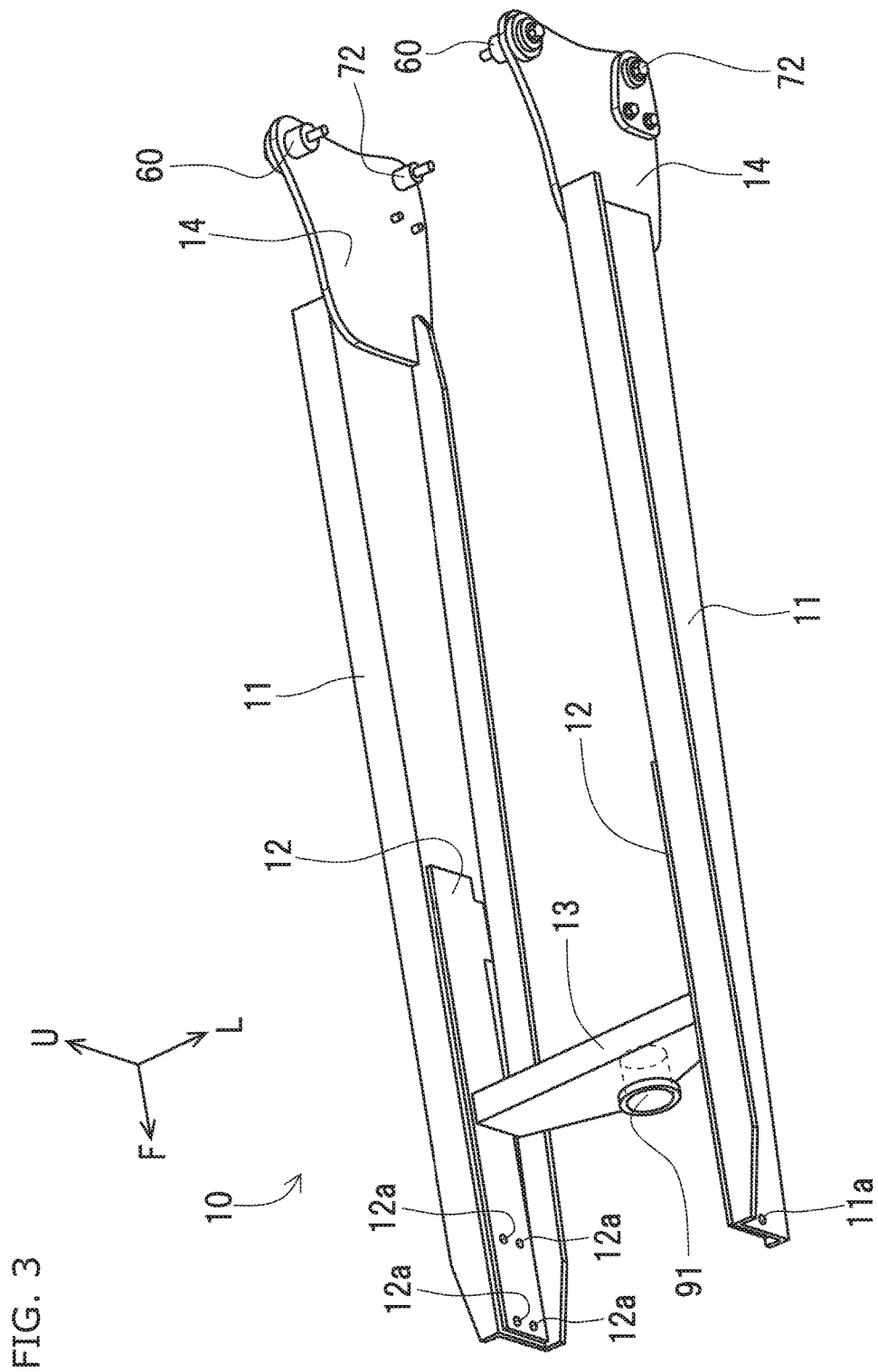
FIG. 3 is a perspective view of a body frame.
Figure 4:
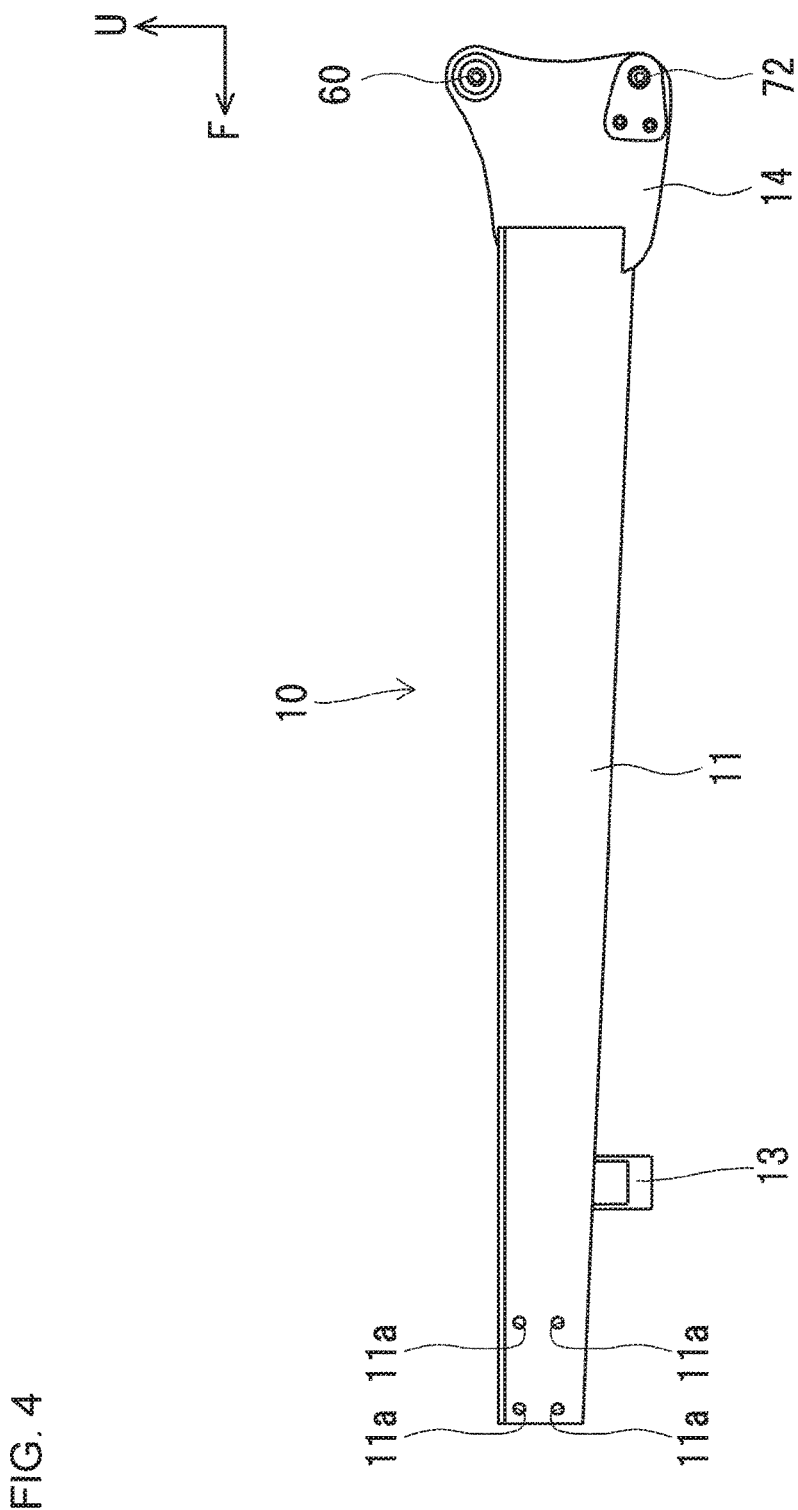
FIG. 4 is a side view of the body frame.

As shown in FIGS. 3 and 4, the body frame 10 includes a pair of beams 11, a pair of reinforced plates 12, the front axle bracket 13, and a pair of attaching members 14.

The pair of beams 11 are disposed at a prescribed interval in the transverse direction such that a longitudinal direction thereof is parallel to the longitudinal direction of the working vehicle 1.

The pair of beams 11 are formed by bending the upper parts of the plate members, disposed such that the plate faces face to each other, outward in the transverse direction (toward the opposite side of the other beam 11, that is, the side apart from the other beam 11) and then by bending the lower parts of the plate member inward in the transverse direction (toward the side of the other beam 11, that is, the side close to the other beam 11).

The lower part of the beam 11 is formed in an inclined shape gradually expanding from the front side toward the rear side in the side view. The upper part of the beam 11 is formed into a shape parallel to the longitudinal direction in the side view.

That is, the length of the lower part of the beam 11 in the vertical direction gradually increases toward the rear side.

A plurality of (four in the present embodiment) attaching holes 11a are formed on the front end part of the beam 11 to attach the front hitch 20 to the body frame 10. Each of the holes 11a is a substantially circular hole penetrating the plate member.

As shown in FIG. 3, the reinforced plate 12 is a plate member extending from the front end part of the body frame 10 to the vicinity of the middle part of the body frame 10 in the longitudinal direction. The longitudinal direction of the reinforced plate 12 corresponds to the longitudinal direction of the working vehicle 1. The pair of reinforced plates 12 are disposed on opposite plate faces of the pair of beams 11 such that plate faces thereof face to each other.

The pair of reinforced plates 12 are disposed on the pair of beams 11 such that the upper parts thereof do not project from the pair of beams 11.

Four attaching holes 12a are formed on the reinforced plate 12 at positions corresponding to the attaching holes 11a of the beam 11 in the side view.

Each of the attaching holes 12a of the reinforced plate 12 is formed in the substantially same shape as the attaching hole 11a of the beam 11, and penetrates the plate faces of the reinforced plate 12.

The pair of reinforced plates 12 are welded to the opposite plate faces of the pair of beams 11, that is, to inner side faces in the transverse direction.

At this time, the pair of reinforced plates 12 are welded such that the welding spots are dispersed on the whole reinforced plate 12, for example, such that the reinforced plate 12 is welded at regular intervals along the outer edge shape thereof.

Thereby, the pair of reinforced plates 12 are welded to the pair of beams 11 dispersively in a wide range. Therefore, in the working vehicle 1, welding distortion of the pair of beams 11 due to welding the pair of reinforced plates 12 can be reduced.

The front axle bracket 13 is a hollow member, and is disposed such that a longitudinal direction thereof is parallel to the transverse direction of the working vehicle 1. The front axle bracket 13 is configured such that a cylindrical member whose axle is parallel to the transverse direction is attached to the lower end part of the transversely middle part of a substantially box-shaped member whose both right and left side faces are opened.

The lower part of the front axle bracket 13 is formed so as to gradually extend downward to the middle part of the transverse direction, that is, to incline downward relative to the transverse direction.

The lower end part of the transverse middle part of the front axle bracket 13, that is, a part corresponding to the cylindrical member is formed as a support hole 91 penetrating the front axle bracket 13 in the longitudinal direction.

Figure 6:
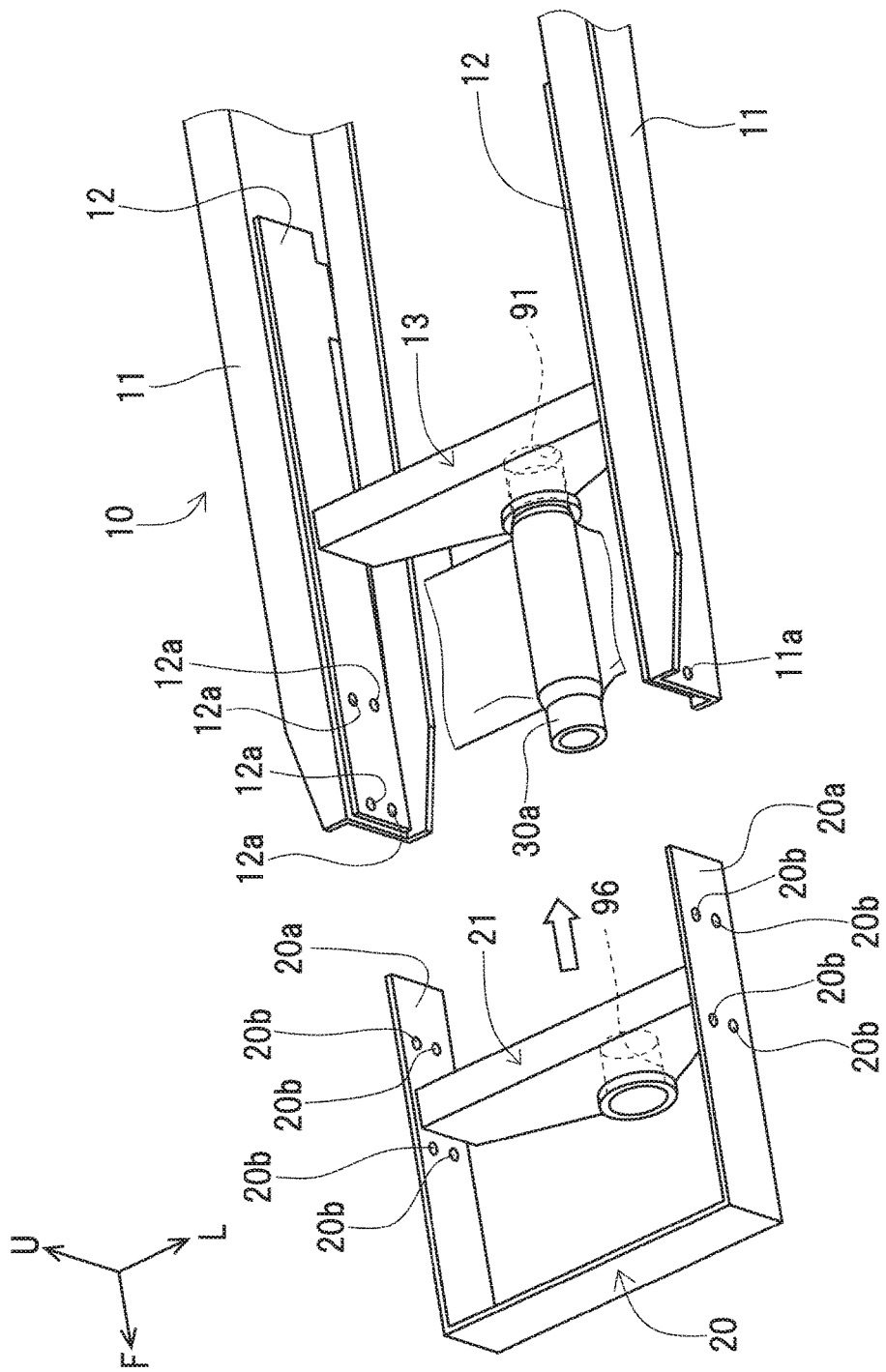
FIG. 6 shows a state where the front hitch is brought close to the body frame.

The inside diameter of the support hole 91 is large enough that the shaft part 30a of the front axle bracket 13 can be inserted into the support hole 91 (see FIG. 6). A bearing supporting the shaft part 30a of the front axle bracket 13 is disposed on the inside of the support hole 91.

Both right and left end parts of the front axle bracket 13 are welded to the longitudinal middle parts of the pair of reinforced plates 12.

At this time, both right and left end parts of the front axle bracket 13 are welded along the form of the outer edge parts thereof.

That is, the front axle bracket 13 is not directly welded to the pair of beams 11.

Thereby, the pair of beams 11 receive welding distortion of the pair of reinforced plates 12, due to welding the front axle bracket 13, in the wide range of the pair of beams 11, so that the welding distortion of the pair of beams 11 can be reduced.

In this way, the front axle bracket 13 of the present embodiment corresponds to one front axle bracket welded to a reinforced plate in the present invention.

As shown in FIGS. 3 and 4, a pair of attaching members 14 are disposed, as plate members, on the rear end parts of the pair of the beams 11 such that plate faces thereof oppose to each other. The pair of attaching members 14 support transmission case 40 with two pins 60 and 72 mentioned later including bolts, bosses and so on (see FIG. 1).

The front parts of the pair of attaching members 14 are welded to the pair of the beams 11.

At this time, the front parts of the pair of attaching members 14 are welded along the form of the outer edge parts thereof.

That is, the body frame 10 of the present embodiment is configured as an integral part where the pair of beams 11, the pair of reinforced plates 12, the front axle bracket 13 and the pair of attaching members 14 are integrally attached by welding.

The configuration of the front hitch 20 is described.

Figure 5:
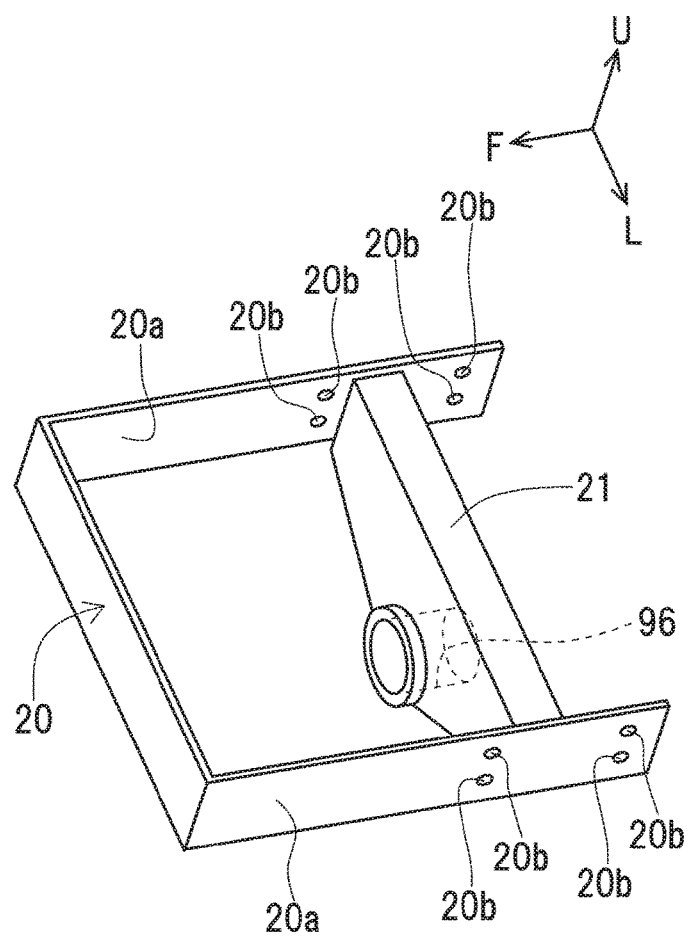
FIG. 5 is a perspective view of a front hitch.

As shown in FIG. 5, the front hitch 20 is formed by bending both right and left end parts of the plate member in a substantially U-shape in the plan view, the plate member being disposed such that the longitudinal direction thereof is parallel to the transverse direction of the working vehicle. The width of the front hitch 20 in the transverse direction is slightly shorter than the distance between opposite plate faces of the pair of beams 11 in the transverse direction. That is, the front hitch 20 is configured so as to be able to move between the opposite plate faces of the pair of beams 11.

In the front hitch 20, both right and left end parts of the plate member which are bent are formed as bent parts 20a.

Four attaching holes 20b are formed on the rear part of each of the bent parts 20a. Two of four attaching holes 20b are formed on the front side of the front axle bracket 21, and the other two of four attaching holes 20b are formed on the rear side of the front axle bracket 21. That is, eight attaching holes 20b are formed on the bent parts 20a of the front hitch 20.

Each of the attaching holes 20b of the front hitch 20 corresponds to each of the attaching holes 11 of the pair of beams 11 in the side view in an assembly process, that is, all attaching holes 20b are formed to be aligned with the attaching holes 11. Each of the attaching holes 20b of the front hitch 20 is formed in the substantially same shape as each of the attaching holes 11a of the pair of beams 11.

The front hitch 20 with this configuration includes the front axle bracket 21.

The front axle bracket 21 is configured similarly to the front axle bracket 13 of the body frame 10 except for attaching to the front hitch 20 and having slightly short width in the transverse direction.

Both right and left end parts of the front axle bracket 21 are welded to opposite plate faces of the bent parts 20a of the front hitch 20, that is, to both bent end parts of the plate member.

At this time, both right and left end parts of the front axle bracket 21 are welded along the form of the outer edge parts thereof.

In this way, the front axle bracket 21 of the present embodiment corresponds to the other front axle bracket welded to a front hitch in the present invention.

That is, the front hitch 20 of the present embodiment is configured as an integral part where the front axle bracket 21 is integrally attached by welding.

Thereby, the front hitch 20 has a closed cross section, so that the rigidity is greatly improved in comparison with one configured of only the front hitch 20.

A procedure of the assembly process of attaching the front hitch 20 to the body frame 10 is described.

As shown in FIG. 6, before attaching the front hitch 20 to the body frame 10, the rear end part of the shaft part 30a of the front axle case 30 is inserted into the support hole 91 of the front axle bracket 13.

The positions in the vertical direction and so on of the body frame 10, the front hitch 20 and the front axle case 30 are previously aligned with a jig and so on.

First, in the assembly process, the front hitch 20 is brought close to the body frame 10 (see the arrow in FIG. 6)

At this time, in the assembly process, the front hitch 20 is brought close to the body frame 10 in the state where the bent parts 20a of the front hitch 20 faces the rear side, that is, in the state that the front axle bracket 21 faces to the front axle case 30.

Figure 7:
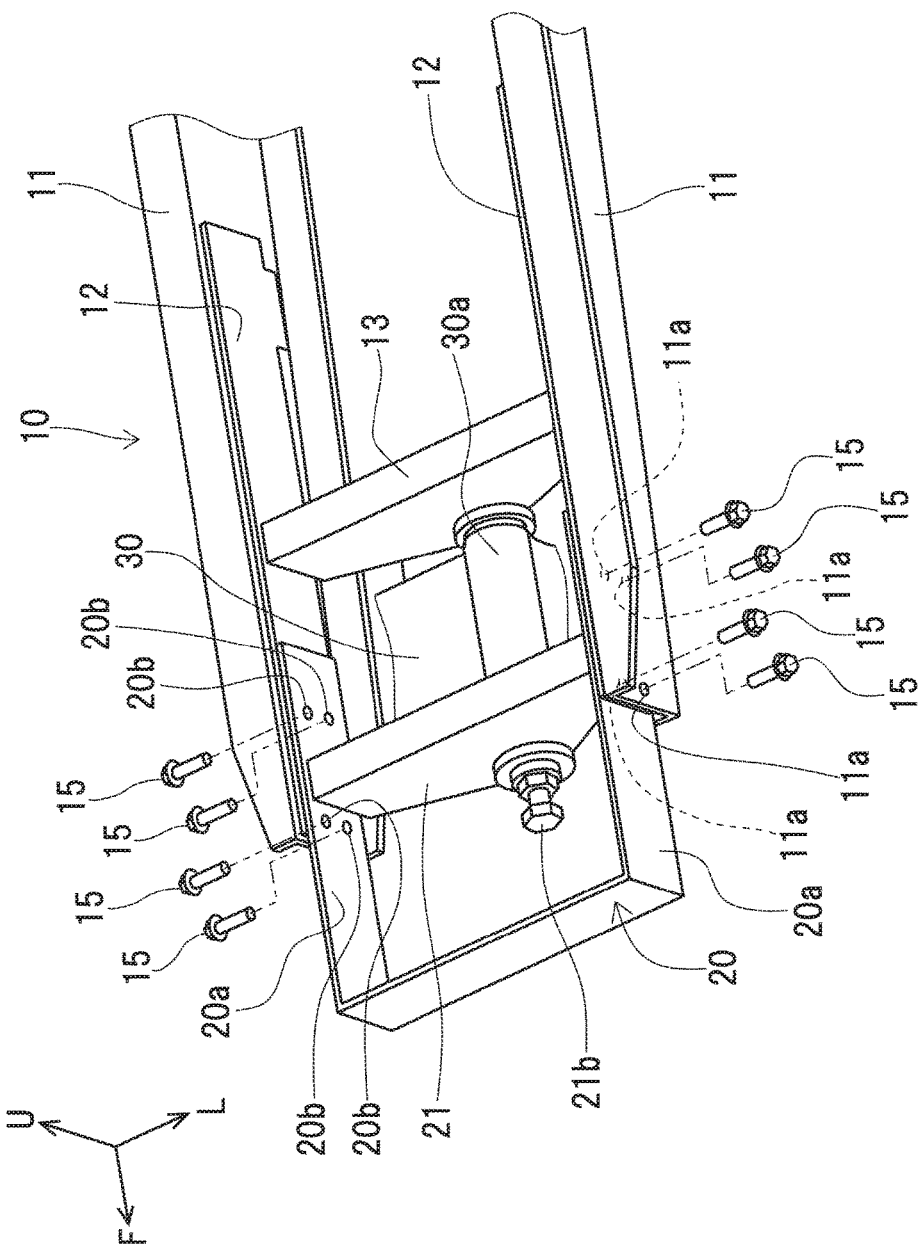
FIG. 7 shows a state where the front hitch is attached to the body frame.

As shown in FIGS. 6 and 7, then, in the assembly process, the front end part of the shaft part 30a of the front axle case 30 is inserted into a support hole 96 of the front axle bracket 21 of the front hitch 20.

Thereby, two front axle brackets 13 and 21 support both front and rear end parts of the shaft part 30a of the front axle case 30 through bearings respectively disposed on the inner surfaces of the support holes 91 and 96.

As shown in FIG. 7, in the assembly process, the front axle case 30 is fixed to the two front axle brackets 13 and 21 by screwing a bolt 21b, from the front, into the support hole 96 of the front axle bracket 21 of the front hitch 20.

Thereby, the working vehicle 1 supports the front axle case 30 through the two front axle brackets 13 and 21.

At this time, in the assembly process, each of the attaching holes 20b corresponds to the each of the attaching holes 11a of the pair of beams 11 and to the each of the attaching holes 12a of the pair of reinforced plates 12 by adjusting the position of the front hitch 20.

In the assembly process, after fixing the front axle case 30, bolts 15 are screwed into the attaching holes 11a of the pair of beams 11, the attaching holes 12a of the pair of reinforced plates 12, and the attaching holes 20b of the front hitch 20.

Thereby, in the assembly process, the front hitch 20 can be attachably and detachably attached to the body frame 10.

Figure 8:
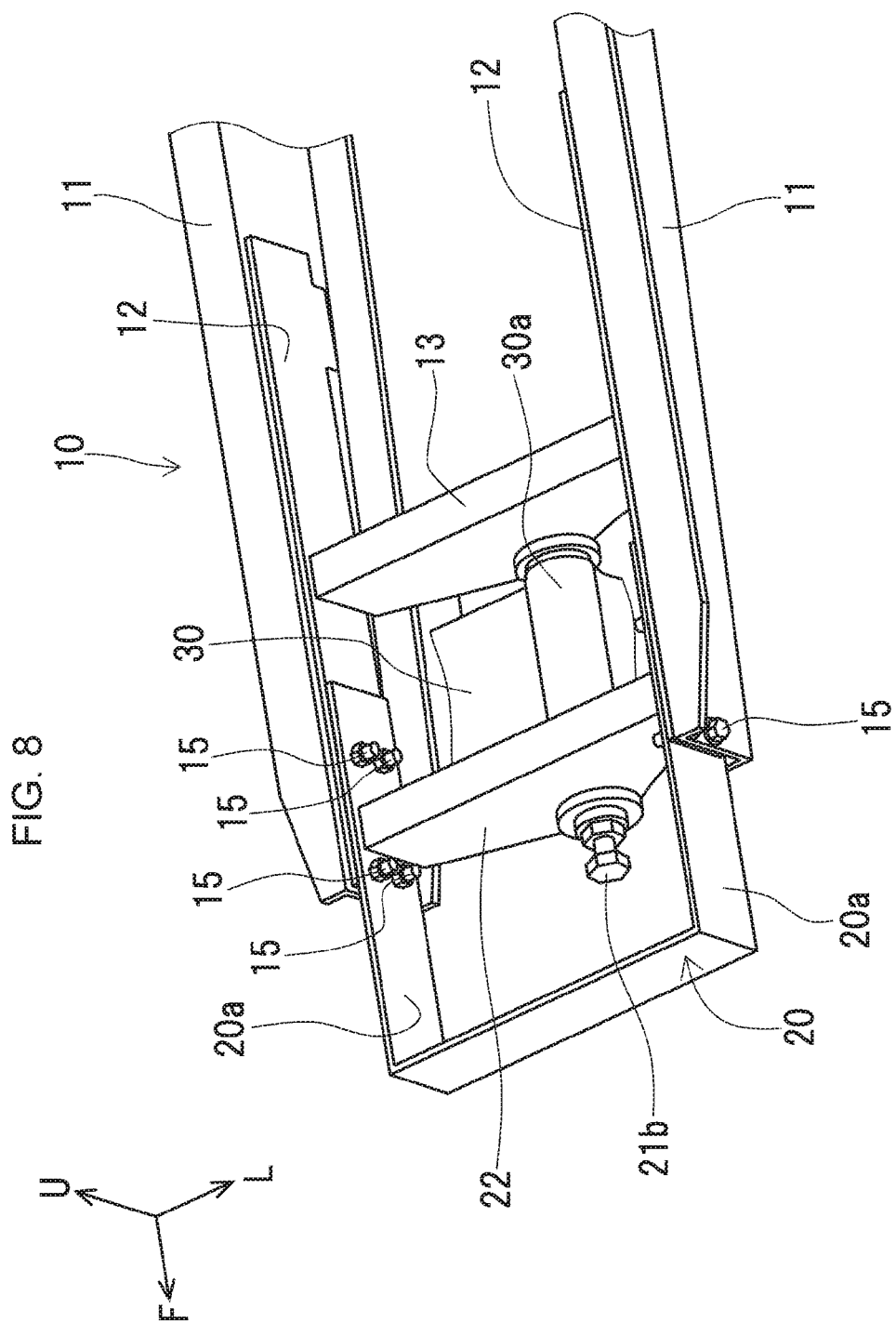
FIG. 8 is a perspective view showing the state where the front hitch is attached to the body frame.

Thereby, as shown in FIG. 8, in the working vehicle 1, the front hitch 20 is attached to the body frame 10 so that the two front axle brackets 13 and 21 are opposed.

In this way, in the working vehicle 1 of the present embodiment, the pair of beams 11, the pair of reinforced plates 12, the two front axle brackets 13 and 21, and the pair of attaching members 14 are connected to each other with the only bolts 15 connecting the body hitch 20 to the body frame 10.

That is, in the working vehicle 1, a large number of parts are connected with a small number of bolts 15, so that the number of parts is reduced.

The pair of reinforced plates 12 are weld to the pair of beams 11. For this reason, before the assembly process, each of the attaching holes 11a of the pair of beams 11 is aligned with the each of the attaching holes 12a of the pair of reinforced plates 12 such that the bolt 15 can be sufficiently screwed.

Therefore, in the working vehicle 1, the body frame 10 and the front hitch 20 can be connected only by aligning each of the attaching holes 20b of the front hitch 20 with each of the attaching holes 11a of the pair of beams 11 and with each of the attaching holes 12a of the pair of reinforced plates 12, which are aligned previously.

That is, in the working vehicle 1, work for aligning each of the attaching holes 11a, each of the attaching holes 12a and each of the attaching holes 20b can be simplified. In the working vehicle 1, the number of parts can be reduced, so that work for connecting the parts with bolts and so on can be reduced.

Therefore, in the working vehicle 1, the assembly process can be simplified.

In the working vehicle 1, the pair of beams 11, the pair of reinforced plates 12, the front axle bracket 13 and the pair of attaching members 14 are configured as the integral part by welding. Therefore, the strength of the body frame 10 can be improved, in comparison with the case where a pair of beams, a pair of reinforced plates, a front axle bracket and a pair of attaching members are connected with bolts.

That is, the working vehicle 1 is configured that the body frame 10 as an integral part and the front hitch 20 as an integral part are connected with the bolts 15 in front of and behind the front axle bracket 21. Therefore, reduction in rigidity of the body frame 10 due to variation of fastening force of the bolt and ununiformlity in rigidity between the front axle brackets 13 and 21 are suppressed.

Therefore, in the working vehicle 1, the rigidity of the body frame 10 can be secured.

The front axle bracket 13 of the body frame 10 is welded to the pair of reinforced plates 12, so that the front axle bracket 13 is attached to the pair of reinforced plates 12 before the assembly process, in the state where the longitudinal direction of the front axle bracket 13 is substantially parallel to the transverse direction of the working vehicle 1.

This is similar to the front axle bracket 21 of the front hitch 20.

For this reason, in the working vehicle 1, position accuracy of the two front axle brackets 13 and 21, that is, parallel degree can be improved, in comparison with the case where two front axle brackets are attached to a body frame and a front hitch.

For example, if a front hitch is configured as an integral part so that a pair of reinforced plates and two front axle brackets are welded the front hitch, the front hitch needs to be fixed on the front and rear end parts of a pair of beams with bolts.

In this case, the length of the front hitch in the longitudinal direction is increased by the length of the welded pair of reinforced plates.

Therefore, in this case, when the front hitch is changed after a working vehicle is shipped, it is difficult to pull the front hitch out and to move to the inside of the pair of beams.

On the other hand, in the front hitch 20 of the present embodiment, the front axle bracket 21 is only welded thereto. For this reason, the length of the front hitch in the longitudinal direction is not long.

Therefore, in the working vehicle 1 of the present embodiment, the front hitch 20 can be easily changed even after the working vehicle 1 is shipped. In the working vehicle 1, the front hitch 20 can be easily changed for a special part where a loader and so on is attached, so that the working vehicle 1 can meet various needs.

That is, in the working vehicle 1, maintainability and flexibility can be improved.

In the working vehicle 1 of the present embodiment, the front end parts of the pair of reinforced plates 12 are extended to the front end parts of the pair of beams 11, so that the plate area of the pair of reinforced plates 12 is larger.

Thereby, the welding spots between the pair of beams 11 and the pair of reinforced plates 12 can be widely dispersed in the longitudinal direction.

Therefore, in the working vehicle 1, the parts where welding distortion is generated can be dispersed.

That is, in the working vehicle 1, deterioration in shape accuracy of the body frame 10 can be suppressed.

The front end parts of the pair of reinforced plates 12 are extended to the front end parts of the beams 11, so that the front hitch 20 is attached to the body frame 10 through the extended front end parts of the pair of reinforced plates 12.

That is, in the body frame 10, the pair of reinforced plates 12 and the front hitch 20 are connected to the front end parts of the beams 11.

Therefore, in the working vehicle 1, rigidity of the front end part of the body frame 10 can be secured. That is, in the working vehicle 1, the rigidity of the body frame 10 can be more surely secured.

Note that the parts for attaching and detaching the front hitch to the body frame are not limited to the bolts in the present embodiment. For example, pins and so on may be used.

Figure 9:
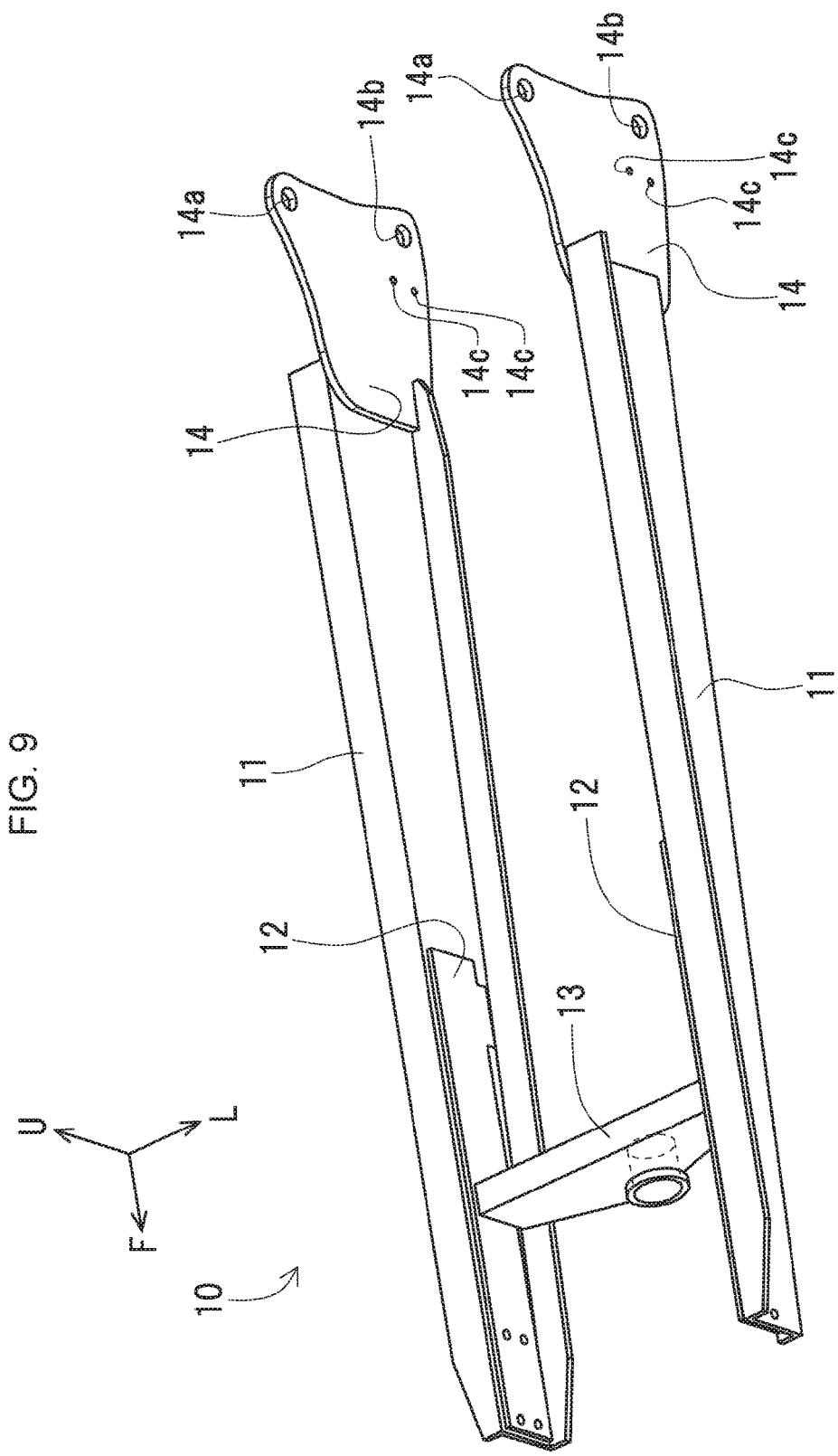
FIG. 9 is a perspective view of the body frame.
Figure 10:
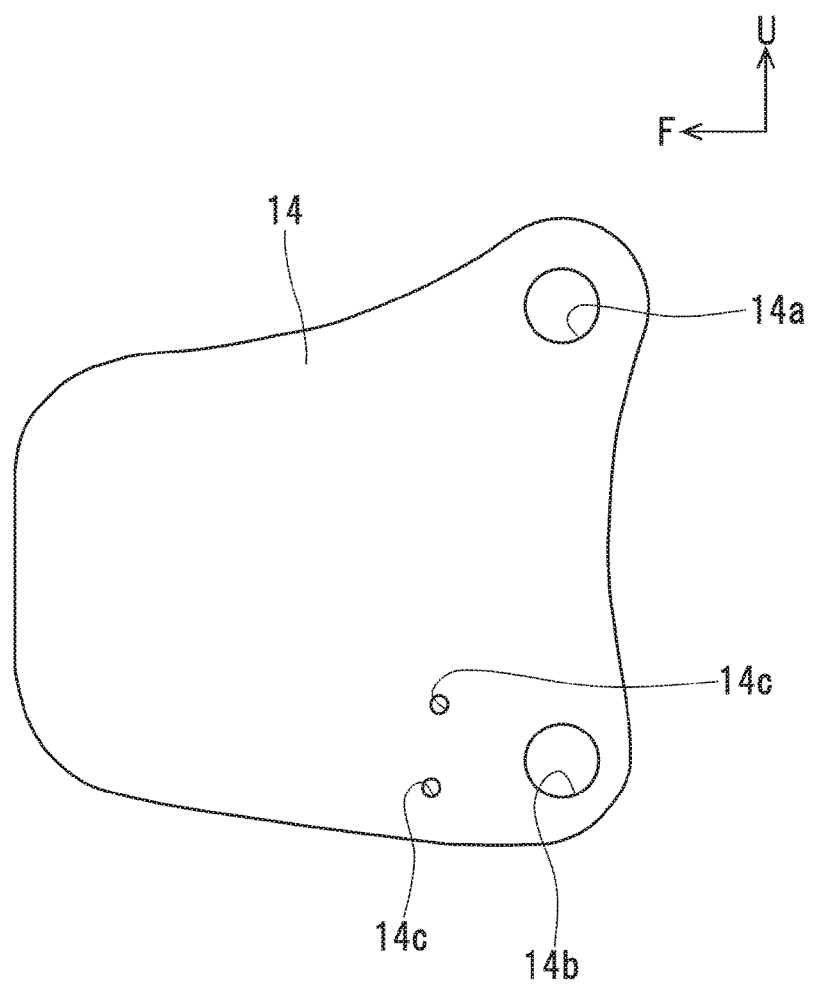
FIG. 10 is a side view of the body frame.

As shown in FIGS. 9 and 10, the pair of attaching members 14 are the plate members facing to each other. The pair of attaching members 14 are formed so as to radially expand smoothly in the vertical direction toward the rear side.

A first attaching hole 14a, a second attaching hole 14b and two bolt holes 14c are formed on the attaching member 14.

The first attaching hole 14a is formed on upper part of the rear end part of the attaching member 14. The first attaching hole 14a penetrates the plate faces of the attaching member 14 in the transverse direction.

The first attaching hole 14a is formed in a substantially circular shape in the side view.

The second attaching hole 14b is formed under the first attaching hole 14a. The second attaching hole 14b has the substantially same shape as the first attaching hole 14a.

Each of the bolt holes 14c is disposed in front of the second attaching hole 14b. The bolt holes 14c are disposed at intervals in the vertical direction. Each of the bolt holes 14c is formed in a substantially circular shape in the side view, and penetrates the plate faces of the attaching member 14 in the transverse direction. A female screw part is formed on the inner peripheral surface of each of the bolt holes 14c.

Thereby, in the working vehicle 1, reduction in rigidity due to variation of fastening force of the bolt, and secures the rigidity of the body frame 10 is suppressed.

In the working vehicle 1, the number of fastening parts for attaching the pair of reinforced plates 12 and so on to the pair of the beams 11 is reduced.

Figure 16A:
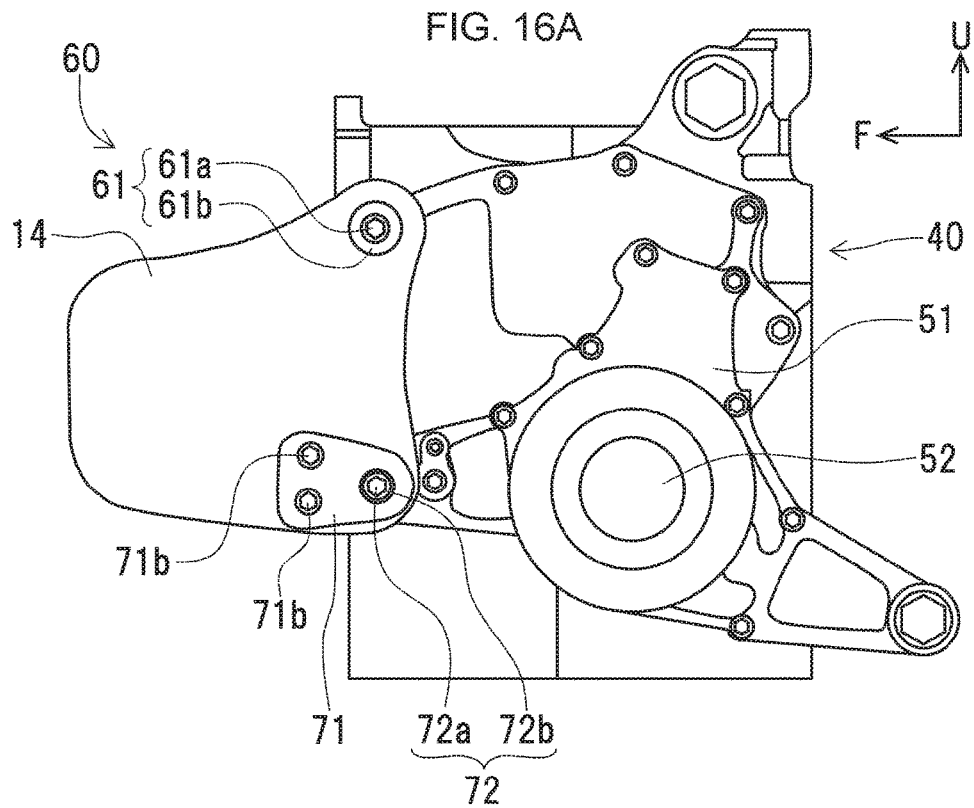
FIG. 16(a) is a side view and FIG. 16(b) is a sectional view.
Figure 16B:
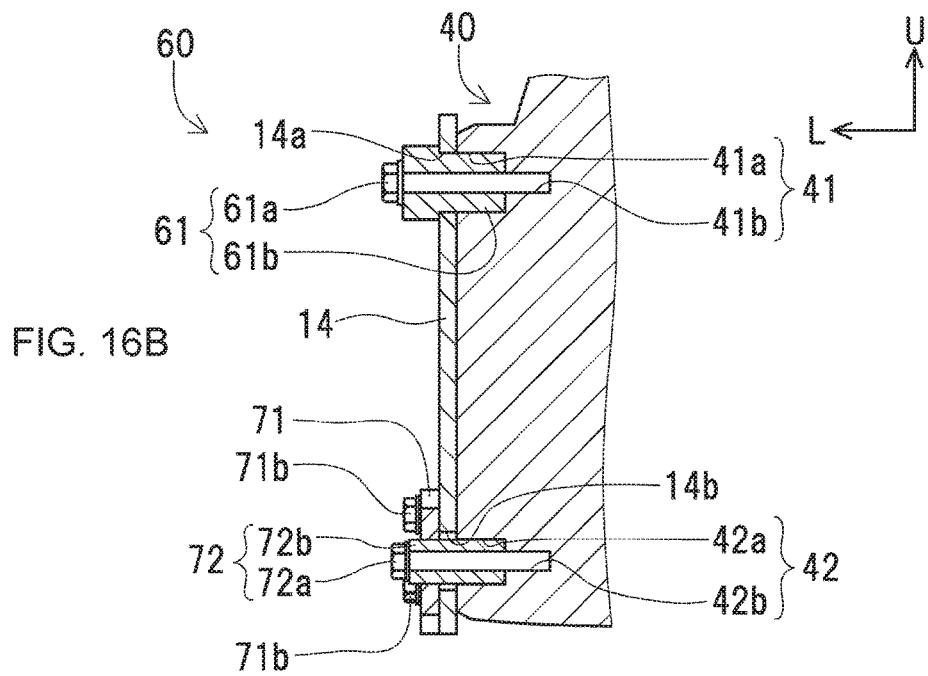

The transmission case 40 is fixed to the inner sides of the pair of attaching members 14, that is, to the opposite plate faces of the pair of attaching members 14 (see FIG. 16).

The configuration of a part of the transmission case 40 which is attached to the body frame 10 is described.

Figure 11B:
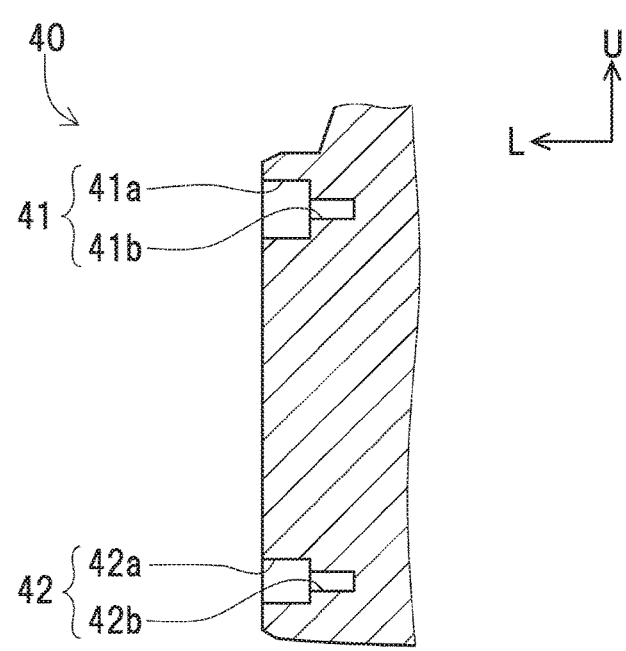

As shown in FIG. 11, a pair of first pin attaching parts 41 and a pair of second pin attaching parts 42 are formed on both right and left sides of the transmission case 40.

The pair of first pin attaching parts 41 are configured similarly to each other except for positions thereof. The pair of second pin attaching parts 42 are configured similarly to each other except for a disposed positions thereof.

For this reason, only the first pin attaching part 41 and the second pin attaching part 42 disposed on the left side of the working vehicle 1 are described below. The description for the first pin attaching part 41 and the second pin attaching part 42 disposed on the left side of the working vehicle 1 is omitted.

The first pin attaching part 41 is a bottomed hole formed in a substantially circular shape in the side view, and is formed on the front side of the transmission case 40. In the first pin attaching part 41, the inner diameter of one side (the inner side of the transmission case 40) is larger than that of the other (the outer side of the transmission case 40), so that steps are formed in the transversely middle part.

In the first pin attaching part 41, a part whose inner diameter is large is formed as a large diameter part 41a, and a part whose inner diameter is small is formed as a small diameter part 41b.

The large diameter part 41a has the substantially same inner diameter as the first attaching hole 14a of the attaching member 14.

A female screw part is formed on the inner peripheral surface of the small diameter part 41b.

The second pin attaching part 42 is formed under the first pin attaching part 41. The distance between the centers of the first pin attaching part 41 and the second pin attaching part 42 is the same as that of the first attaching hole 14a and the second attaching hole 14b of the attaching member 14 (see FIG. 14(b)).

The second pin attaching part 42 is formed in the same shape as the first pin attaching part 41 except that the inner diameter of a large diameter part 42a is smaller than that of the large diameter part 41a of the first pin attaching part 41.

That is, the large diameter part 42a of the second pin attaching part 42 is smaller than the first attaching hole 14b of the attaching member 14.

Figure 14A:
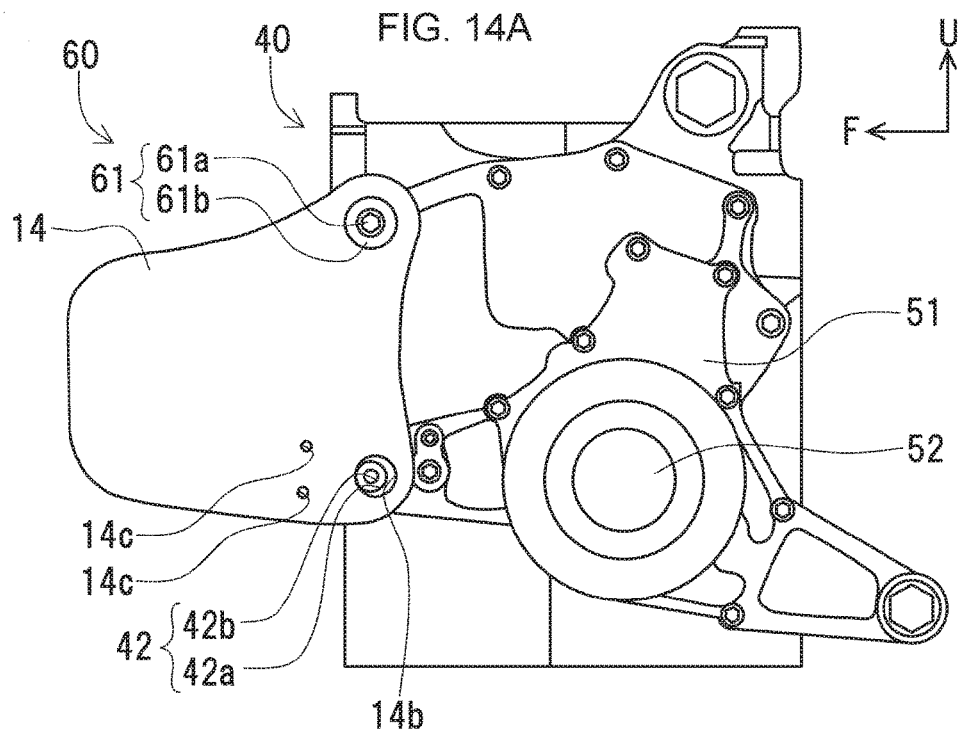
FIG. 14(a) is a side view and FIG. 14(b) is a sectional view.
Figure 14B:
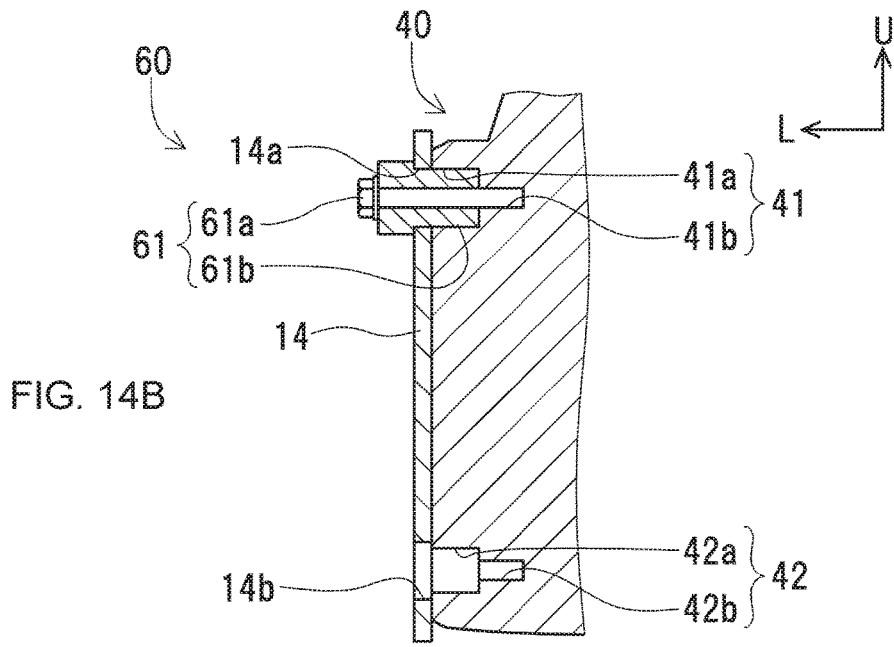

For this reason, the second pin attaching part 42 can be overlapped with the second attaching hole 14b within a prescribed range (see FIG. 14(a)).

In the transmission case 40, after casting, the first pin attaching part 41 and the second pin attaching part 42 are formed by machining. For this reason, in the first pin attaching part 41 and the second pin attaching part 42, high positional accuracy is secured.

The configuration of a pair of transmission case attaching parts 60 for attaching the transmission case 40 to the body frame 10 is described.

As shown in FIG. 1, the pair of transmission case attaching parts 60 are disposed on both right and left sides of the working vehicle 1 in the rear part of the working vehicle 1.

The transmission case attaching parts 60 are configured similarly to each other except for a disposed position.

For this reason, only the transmission case attaching part 60 disposed on the left side of the working vehicle 1 are described below. The description for the transmission case attaching part 60 disposed on the left side of the working vehicle 1 is omitted.

Figure 12:
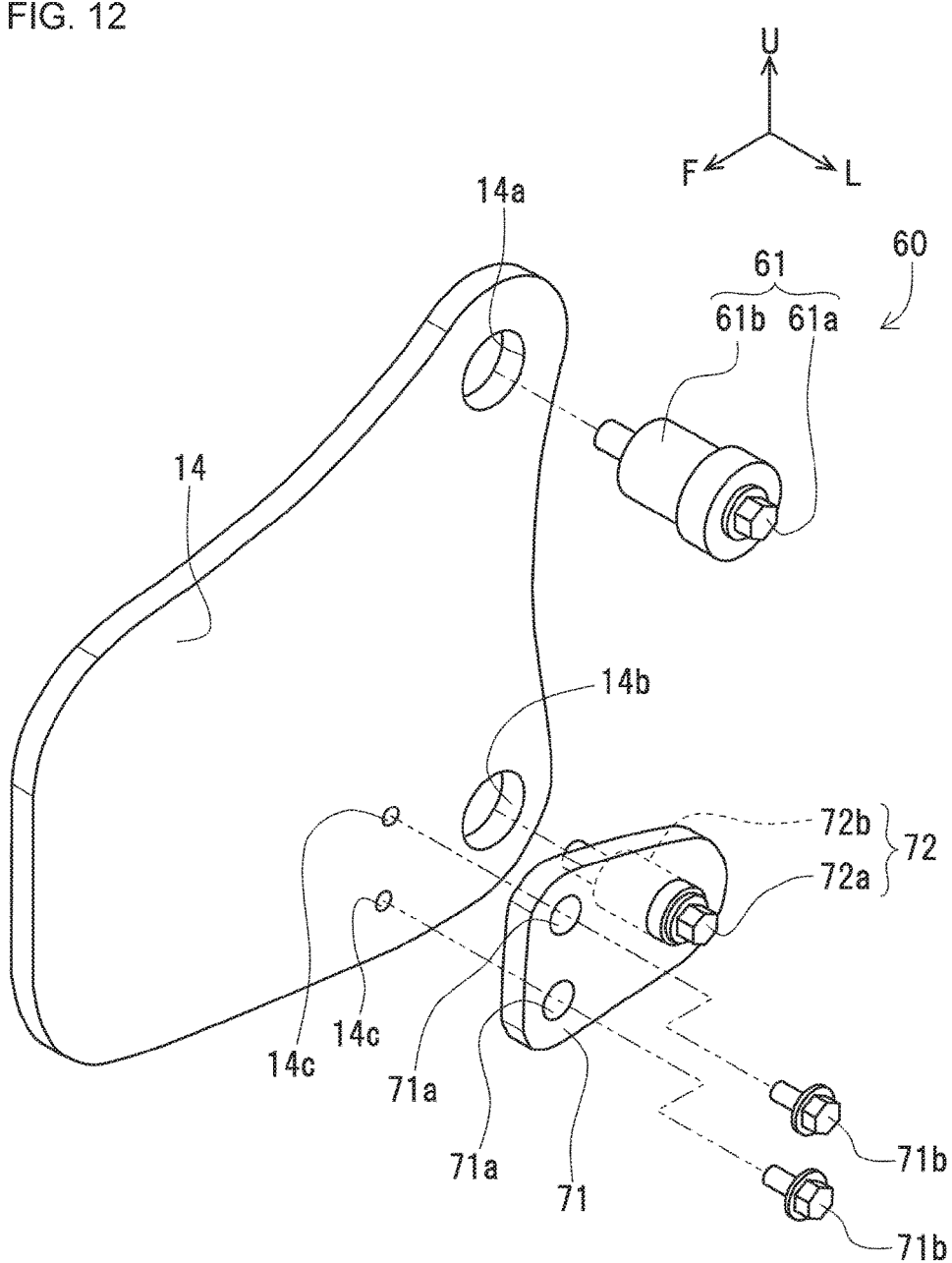
FIG. 12 is a perspective view of a disassembled transmission case attaching part.
Figure 13:
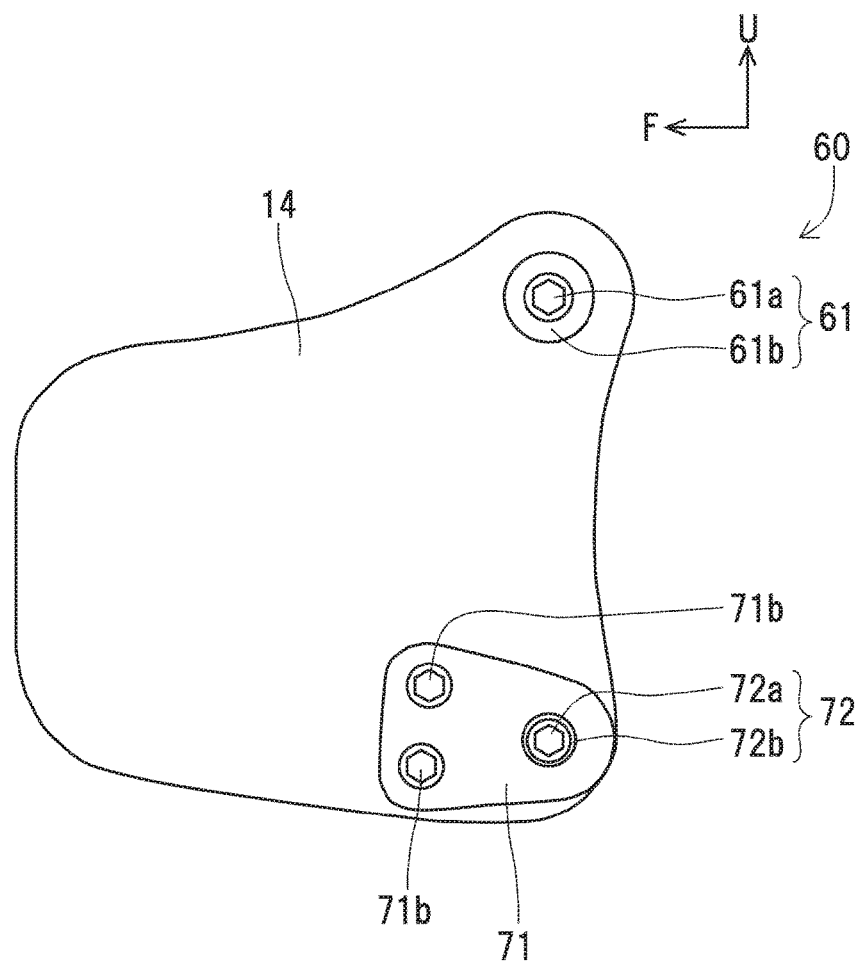
FIG. 13 is a side view of the transmission case attaching part.

As shown in FIGS. 12 and 13, the transmission case attaching part 60 is disposed on the left side (the outer side) of the attaching member 14. The transmission case attaching part 60 includes a first pin 61, a plate 71 and a second pin 72.

The first pin 61 is configured that a shaft part of a bolt 61a is inserted into a boss 61b.

The bolt 61a is formed so as to be screwed into the small diameter part 41b of the first pin attaching part 41 of the transmission case 40.

In the boss 61b, the outer diameter of one side (the outer side) is larger than that of the other side (the inner side). The other side (the small diameter side) of the boss 61b has the outer diameter slightly smaller than the inner diameter of the large diameter part 41a of the first pin attaching part 41 and than the inner diameter of the first attaching hole 14a of the attaching member 14.

The one side (the large diameter side) of the boss 61b has the outer diameter slightly larger than the inner diameter of the large diameter part 41a of the first pin attaching part 41 and than the inner diameter of the first attaching hole 14a of the attaching member 14.

The length of the boss 61b is shorter than that of the bolt 61a in the axial direction.

In the first pin 61, the boss 61b is inserted into the first attaching hole 14a.

The plate 71 is a plate member disposed such that a plate face faces to the attaching member 14. The plate 71 is formed so as to expand gradually in the vertical direction toward the front side in the side view.

Two bolt attaching parts 71a are formed on the plate 71.

The two bolt attaching parts 71a are holes penetrating the plate face of the plate 71, and are formed in a substantially circular shape in the side view. Each of the bolt attaching parts 71a has the inner diameter larger than that of the bolt hole 14c.

The bolt attaching parts 71a are disposed on both upper and lower sides in the front end part of the plate 71. The distance between the centers of the bolt attaching parts 71a is the same as the distance between the centers of the bolt holes 14c.

The bolt 71b having a head larger than the bolt attaching part 71a is screwed into each of the bolt holes 14c through each of the bolt attaching parts 71a.

Thereby, the plate 71 is fixed to the attaching member 14.

The second pin 72 is configured that the shaft part of a bolt 72a is inserted into a boss 72b.

The bolt 72a is formed so as to be screwed into the small diameter part 42b of the second pin attaching part 42 of the transmission case 40.

The boss 72b has the outer diameter slightly smaller than the inner diameter of the large diameter part 42a of the second pin attaching part 42. That is, the boss 72b has the outer diameter smaller than the inner diameter of the second attaching hole 14b of the attaching member 14. The boss 72b has the outer diameter smaller than the outer diameter of the other side (the small diameter side) of the boss 61b of the first pin 61.

The length of the boss 72b is shorter than the length of the bolt 72a in the axial direction.

The second pin 72 is inserted into a hole formed on the rear end part of the plate 71, and the outer peripheral edge part of the boss 72b is welded to the plate 71, so that the second pin 72 is integrally configured with the plate 71.

The boss 72b of the second pin 72 is inserted into the second attaching hole 14b when the plate 71 is fixed to the attaching member 14. At this time, a gap is formed between the boss 72b of the second pin 72 and the second attaching hole 14b.

In the transmission case attaching part 60, the first pin 61 is inserted into the first pin attaching part 41 of transmission case 40 through the attaching member 14, and the second pin 72 is inserted into the second pin attaching part 42 through the attaching member 14, so that the plate 71 is fixed to the attaching member 14. Thereby, the transmission case 40 is fixed to the body frame 10 (see FIG. 16(b)).

Figure 15A:
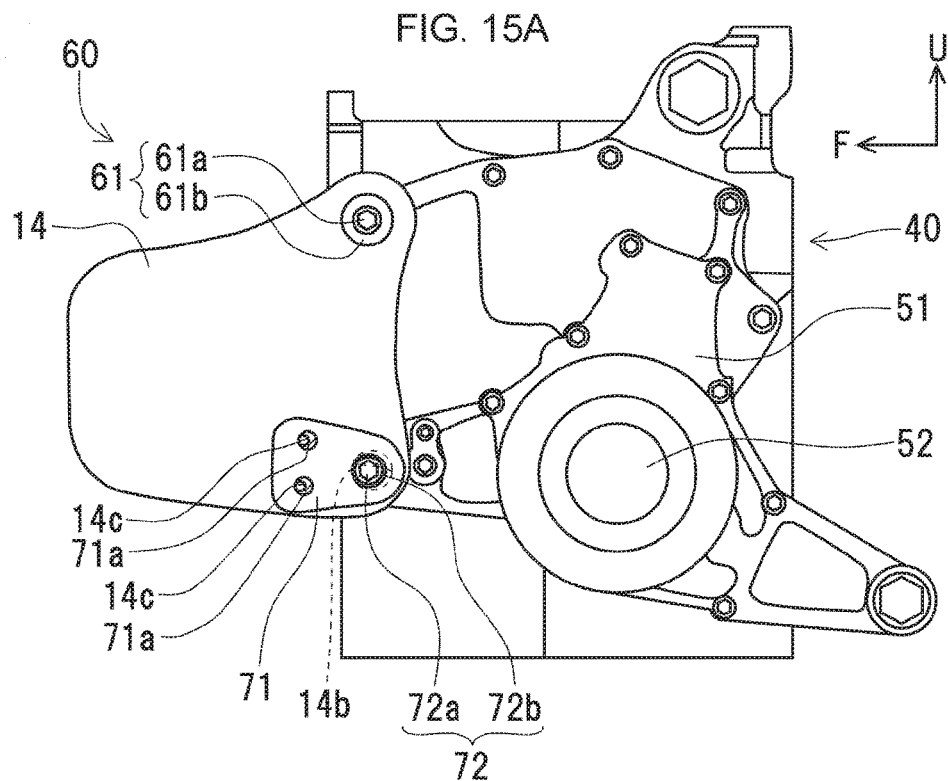
FIG. 15(a) is a side view and FIG. 15(b) is a sectional view.
Figure 15B:
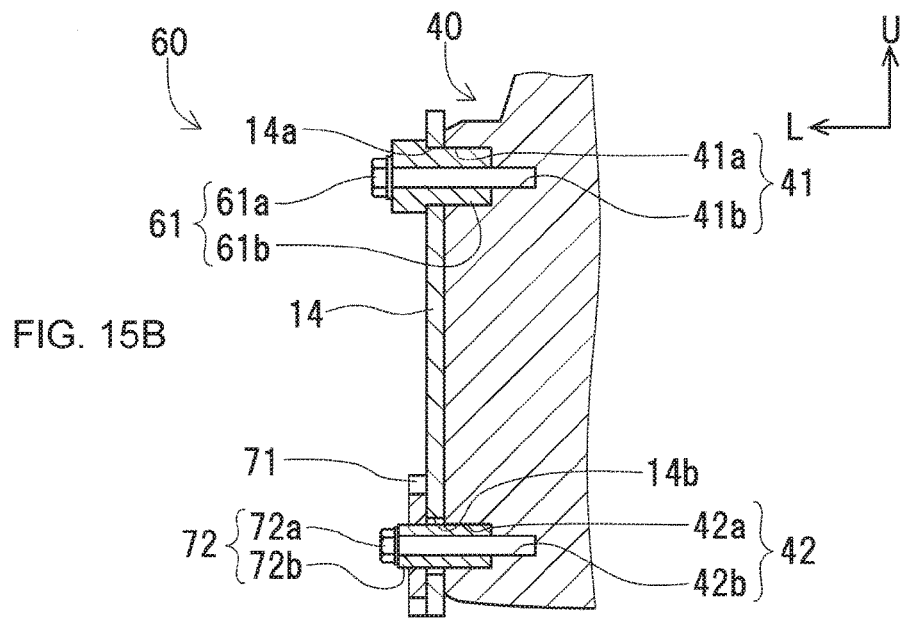

The procedure of the assembly process for fixing the transmission case 40 to the body frame 10 through the transmission case attaching part 60 is described referring to FIGS. 14 to 16.

Note that the body frame 10 is aligned with the transmission case 40 in the vertical direction with a jig and so on before the assembly process.

In the transmission case 40, both right and left sides thereof are fixed through the pair of transmission case attaching parts 60. The procedures for fixing the transmission case 40 at both right and left sides are the same.

For this reason, only the procedure for fixing the left side of the transmission case 40 to the body frame 10 is described below, and the description for the procedure for fixing the right side of the transmission case 40 to the body frame 10 is omitted.

Note that, it is assumed that shape error occurs in the body frame 10 due to influence of welding distortion below. That is, the first attaching hole 14a, the second attaching hole 14b and each of the bolt holes 14c of the attaching member 14 are not disposed on the desired positions.

In this case, the first attaching hole 14a and the second attaching hole 14b are disposed so as to be misaligned with the first pin attaching part 41 and the second pin attaching part 42 disposed at desired position by casting.

As shown in FIG. 14, in the assembly process, first, the transmission case 40 is brought close to the attaching member 14 (the body frame 10), and the center of the first attaching hole 14a is aligned with the center of the first pin attaching part 41.

In the assembly process, then, the boss 61a of the first pin 61 is inserted into the first attaching hole 14a and into the large diameter part 41a of the first pin attaching part 41 of the transmission case 40.

The boss 61b of the first pin 61 has the outer diameter slightly smaller than the first attaching hole 14a and the inner diameter of the large diameter part 41a of the first pin attaching part 41.

For this reason, the first pin 61 is closely inserted into the first attaching hole 14a and into the large diameter part 41a of the first pin attaching part 41.

In the present embodiment, the wording "the first pin 61 is closely inserted" represents that the first pin 61 is inserted in the state of forming a gap between the first pin 61 and the first attaching hole 14a which is small enough that the first pin 61 is inserted into the first attaching hole 14a.

That is, the first pin 61 is inserted into the first attaching hole 14a only at a prescribed position.

In the assembly process, after inserting the boss 61b of the first pin 61, the bolt 61a of the first pin 61 is screwed into the small diameter part 41b of the first pin attaching part 41 of the transmission case 40.

Thereby, the first pin 61 inserted into the first attaching hole 14a is fixed to the transmission case 40.

At this point in time, the transmission case 40 is connected to the attaching member 14 (the beam 11 of the body frame 10) with only the first pin 61.

For this reason, the transmission case 40 can rotate on the first pin 61 relatively with respect to the attaching member 14.

That is, in the working vehicle 1 of the present embodiment, in the assembly process, first, the transmission case 40 is supported with the first pin 61.

Accordingly, in the working vehicle 1, the outer diameter of the boss 61b of the first pin 61 is larger than that of the boss 72b of the first pin 72, so that shape accuracy and rigidity of the first pin 61 are secured.

As shown in FIGS. 14 and 15, after inserting the first pin 61, in the assembly process, the boss 72b of the second pin 72 is inserted into the second attaching hole 14b of the attaching member 14 and into the large diameter part 42a of the second pin attaching part 42 of the transmission case 40.

The second attaching hole 14b is disposed so that the center thereof is misaligned with the center of the second pin attaching part 42 due to the influence of the welding distortion.

Accordingly, in the working vehicle 1 of the present embodiment, the second attaching hole 14b is formed in a substantially circular shape, in the side view, having the inner diameter larger than that of the second pin attaching part 42, so that the range where the boss 72b of the second pin 72 is inserted is expanded.

Thereby, in the working vehicle 1, the boss 72b of the second pin 72 can be inserted to the second attaching hole 14b and into the large diameter part 42a of the second pin attaching part 42 even if the shape error of the body frame 10 occurs due to the influence of the welding distortion.

The boss 72b has the outer diameter slightly smaller than that of the large diameter part 42a of the second pin attaching part 42.

For this reason, the second pin 72 is closely inserted into the large diameter part 42a of the second pin attaching part 42, and is loosely inserted into the second attaching hole 14b.

In the present embodiment, the wording "the second pin 72 is loosely inserted" represents that the second pin 72 is inserted in the state of forming a gap between the second pin 72 and the second attaching hole 14b larger enough that the second pin 61 can be inserted into the second attaching hole 14b.

That is, the second pin 72 can be inserted into the second attaching hole 14b at a prescribed range.

In the assembly process, after inserting the boss 72b of the second pin 72, the bolt 72a of the second pin 72 is screwed into the small diameter part 42b of the first pin attaching part 42 of the transmission case 40.

In this way, the second pin 72 inserted into the second attaching hole 14b is fixed to the transmission case 40 and to the beam 11.

Thereby, the plate 71 where the second pin 72 is welded is attached to the transmission case 40.

As shown in FIGS. 15 and 16, in the assembly process, after inserting the second pin 72, each of the bolts 71 is inserted into each of the bolt holes 71a of the plate 71, and each of the bolts 71b is screwed into each of the bolt holes 14c of the attaching member 14.

In the present embodiment, when the shape error of the body frame 10 occurs, each of the bolt holes 71a is misaligned with each of the center of the bolt holes 14c depending on the position of the second pin 72.

Accordingly, in the working vehicle 1, each of the bolt holes 71a is formed in a substantially circular shape, in the side view, having the inner diameter larger than that of each of the bolt hole 14c, so that the range where each of the bolts 71b is inserted into each of the bolt holes 71a is expanded.

Thereby, in the working vehicle 1, each of the bolts 71b can be screwed into each of the bolt holes 71a even if the shape error of the body frame 10 occurs due to the influence of the welding distortion.

Thereby, the transmission case 40 is fixed to the inner side of the beam 11 by the first pin 61 and the second pin 72.

Thereby, in the working vehicle 1, the transmission case 40 is fixed to the body frame 10 without poor assembly such that the second pin 72 can not be inserted into the second pin attaching part 42 of the transmission case 40.

That is, in the working vehicle 1, the transmission case 40 is surely fixed to the body frame 10 even if the body frame 10 is used which is formed by integrally welding a plurality of parts.

Therefore, in the working vehicle 1, the rigidity of the body frame 10 can be secured, the shape error of the body frame 10 can be absorbed, and the number of parts is reduced.

Another embodiment of the second attaching hole 14b of the attaching member 14 is described.

Note that parts except for a second attaching hole 114b of the attaching member 14 are the same as the present embodiment. Therefore, the parts are indicated by the same characters as the present embodiment, and the description for the parts is omitted.

Figure 17:
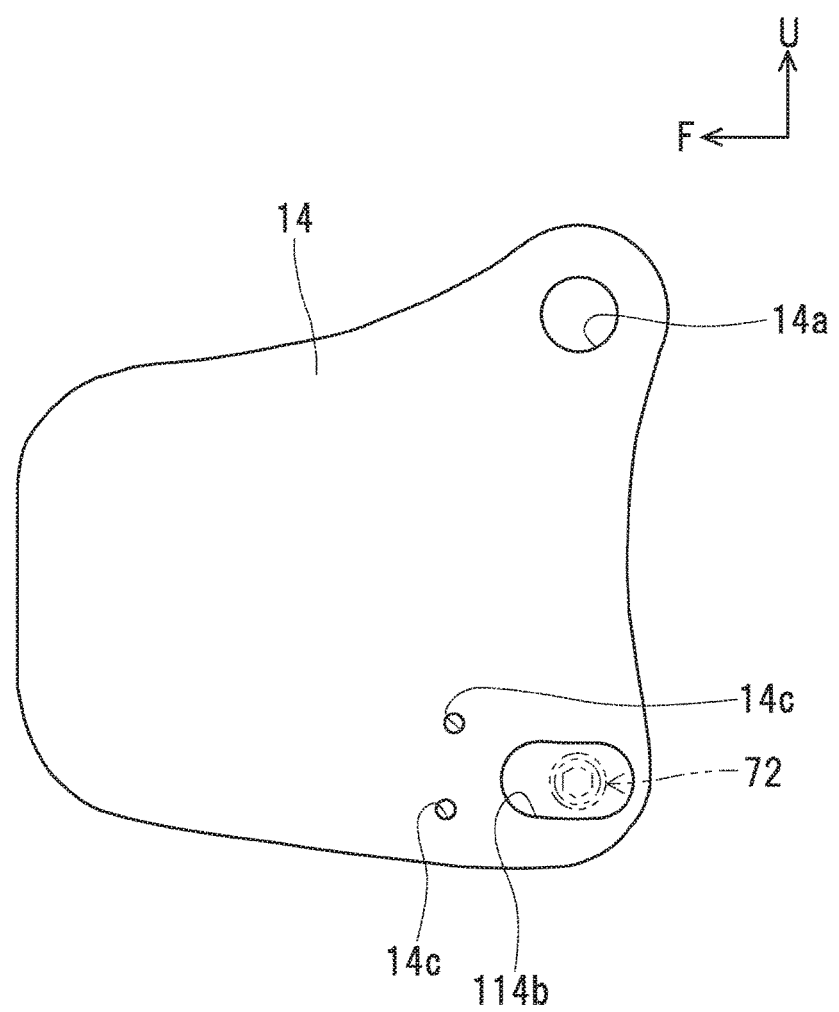
FIG. 17 shows a second attaching hole of another embodiment.

As shown in FIG. 17, the second attaching hole 114b is formed in a substantially circular arc shape, in the side view, centered about the first attaching hole 14a, that is, the first pin 61. The length of the second attaching hole 114b is longer than the outer diameter of the boss 72b of the second pin 72 in the vertical direction.

When the boss 72b is inserted into the second attaching hole 114b, the second pin 72 can move from the front-side face to the rear-side face of the second attaching hole 114b.

Figure 18A:
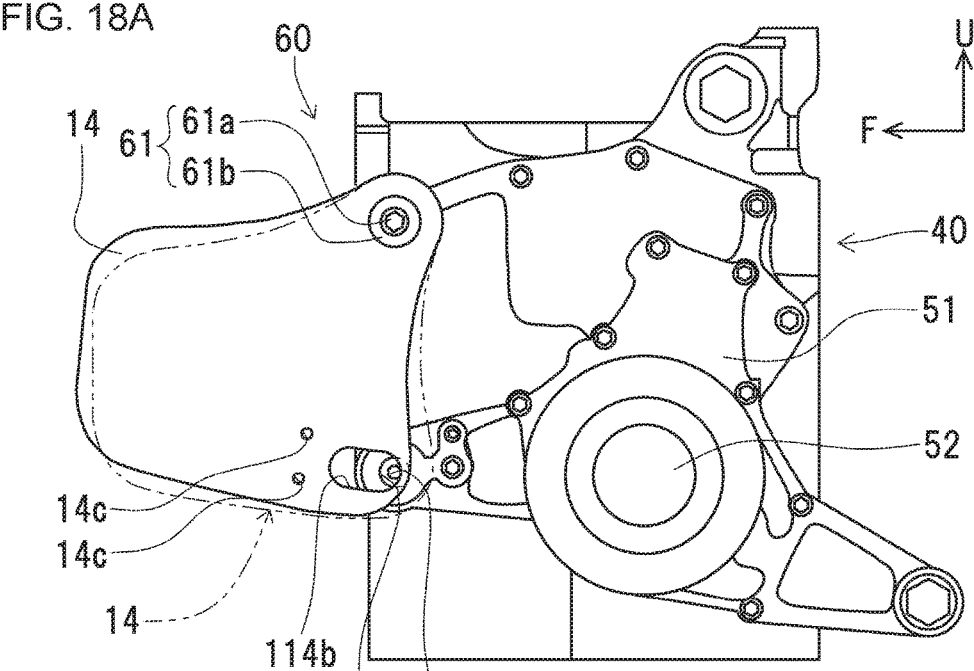
FIG. 18 shows a state where the transmission case is rotated.
Figure 18B:
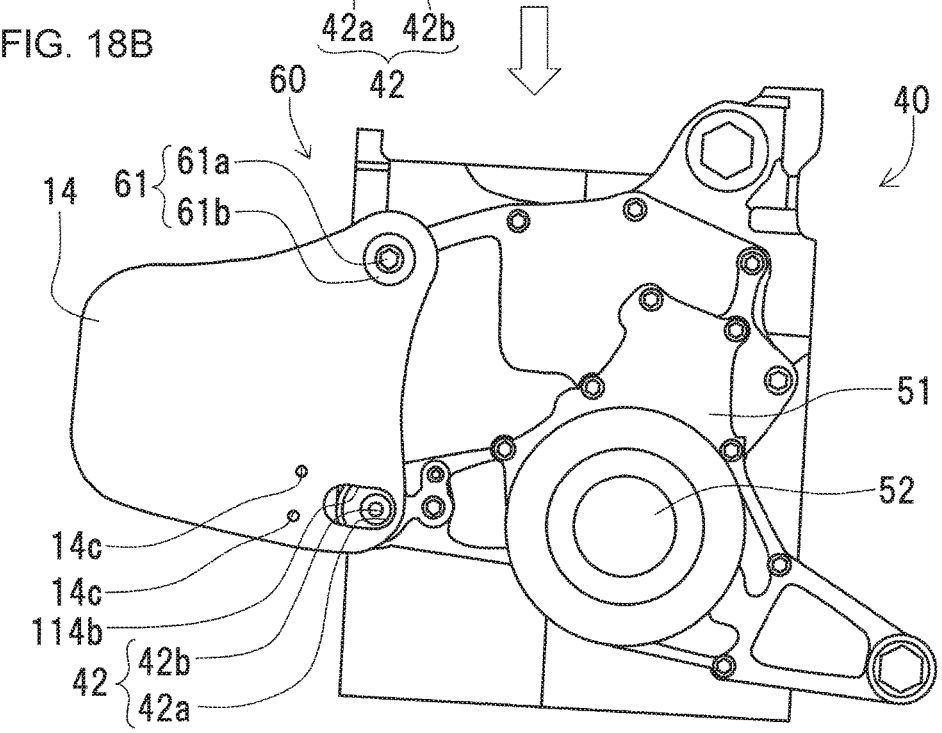
Figure 19:
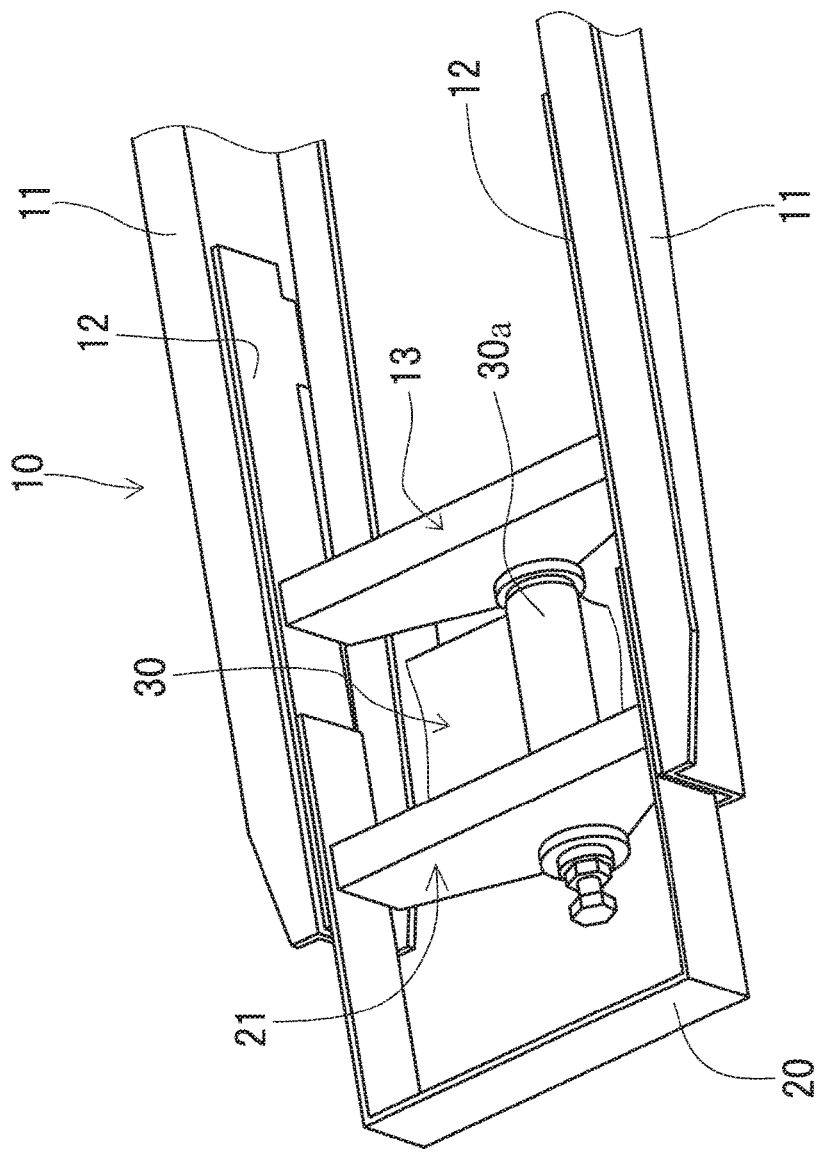
FIG. 19 is a perspective view of a front axle bracket and the front axle case.

The shape error of the body frame 10 due to the welding distortion is accumulated. FIG. 18 shows state of misaligning the position of the body frame 10 with respect to the transmission case 40 largely when the first pin 61 is inserted into the first pin attaching part 41 of the transmission case 40.

In this case, in the assembly process, the position of the body frame 10 can be adjusted to the transmission case 40 by rotating the transmission case 40 about the first pin 61.

Accordingly, in another embodiment, the second attaching hole 114b is formed in a substantially circular arc shape, in the side view, centered about the first pin 61. That is, the second attaching hole 114b is formed in a shape along the direction providing reduction of the shape error of the body frame 10. Therefore, adjustment amount of the body frame 10 with respect to the transmission case 40 can be secured without an unnecessarily large size of the second attaching hole 114b.

Thereby, in the working vehicle 1, the shape error of the body frame 10 can be effectively reduced.

Note that positional relation between the first attaching hole and the second attaching hole is not limited to the present embodiment. For example, the first attaching hole may be formed on the lower side of the attaching member, and the second attaching hole may be formed on the upper side of the attaching member.

The second attaching hole may have a shape where the second pin can be loosely inserted, and is not limited to the present embodiment.

The bearing configuration of the present embodiment is described.

Figure 20:
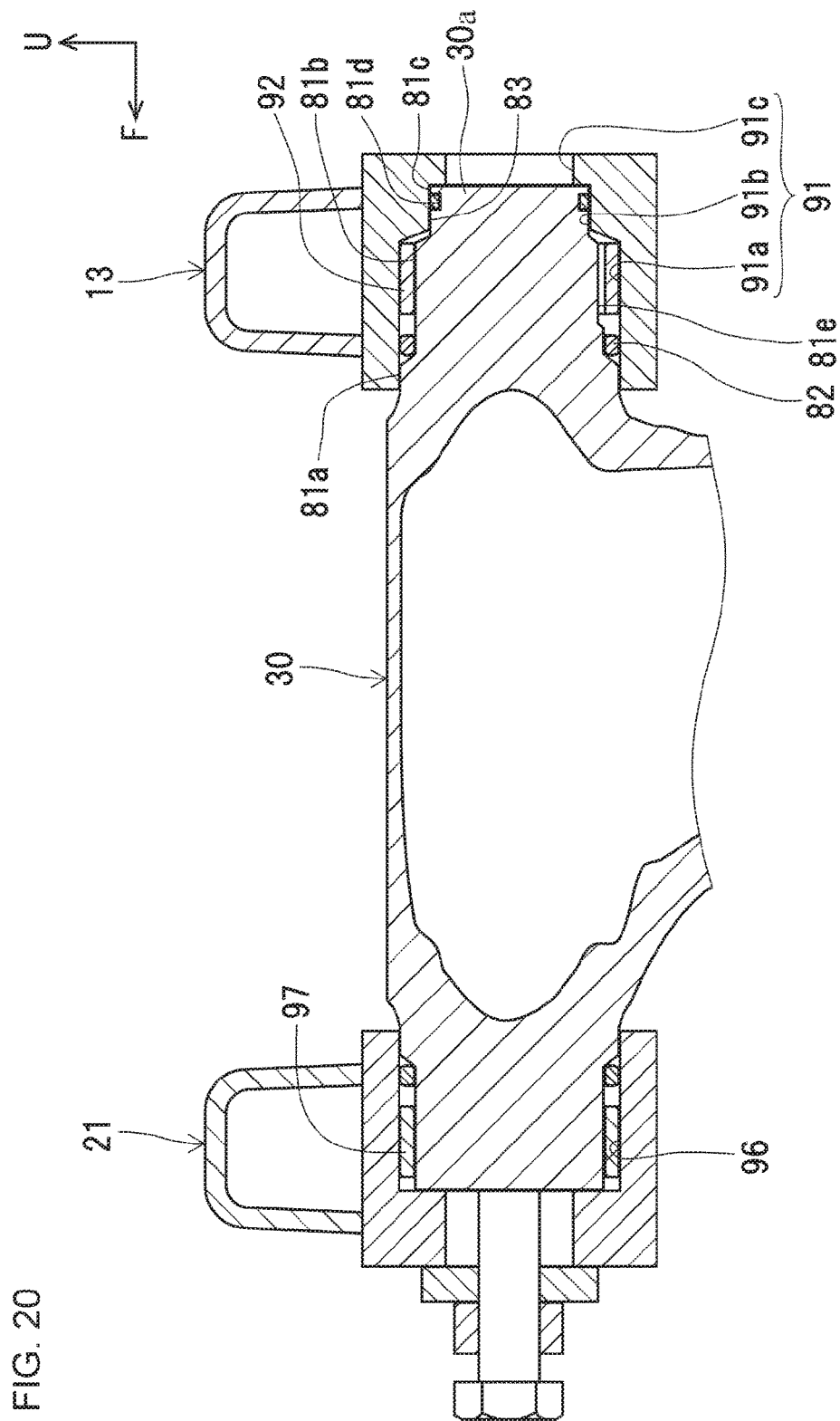
FIG. 20 is a sectional side view of the front axle bracket and the front axle case.

As shown in FIG. 20, in the bearing configuration, both front and rear sides of a bearing 92 of a supporting hole 21 of the front axle bracket 13 are sealed by two O-rings 82 and 83 of the front axle case 30.

The supporting hole 21 is described.

Figure 21:
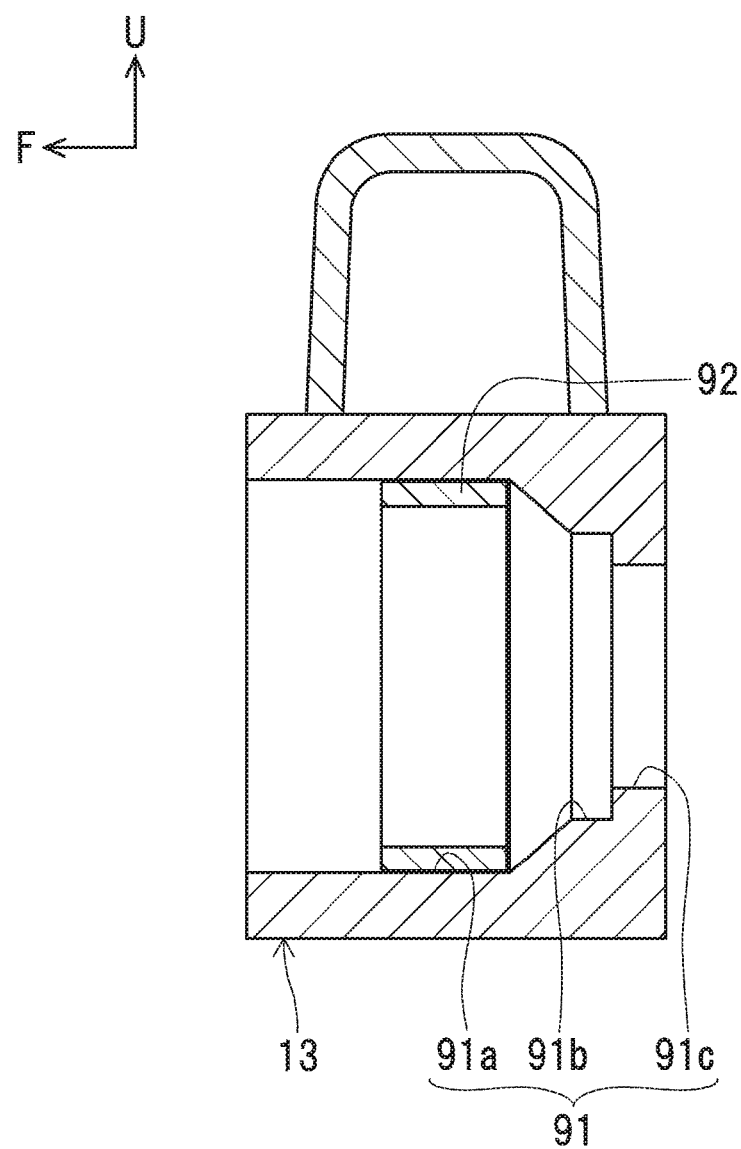
FIG. 21 is a sectional side view of the front axle bracket.

As shown in FIG. 21, in the supporting hole 21 with the bearing configuration, the inner diameter gradually decreases with two steps toward the rear side. The parts of the supporting hole 21 having different inner diameter are formed as a large diameter part 91a, a middle diameter part 91b and a small diameter part 91c in order from the front side (the part having a large inner diameter).

The large diameter part 91a is formed from the front end part to the middle part of the supporting hole 21. The bearing 92 is disposed on the rear end part of the large diameter part 91a.

In this way, the supporting hole 21 of the present embodiment corresponds to an attaching hole where the bearing 92 is disposed.

The middle diameter part 91b has an inner diameter smaller than that of the bearing 92. A tapered face is formed between the large diameter part 91a and the middle diameter part 91b so as to converge on the center of the supporting hole 21 toward the rear side.

The small diameter part 91c has an inner diameter smaller than that of middle diameter part 91b to some extent. A step face is formed along the radial direction of the supporting hole 21 between the middle diameter part 91b and the small diameter part 91c.

The shaft part 30a projecting from the front axle case 30 to the rear side (hereinafter referred to as simply "the shaft part 30a") is described.

Figure 22:
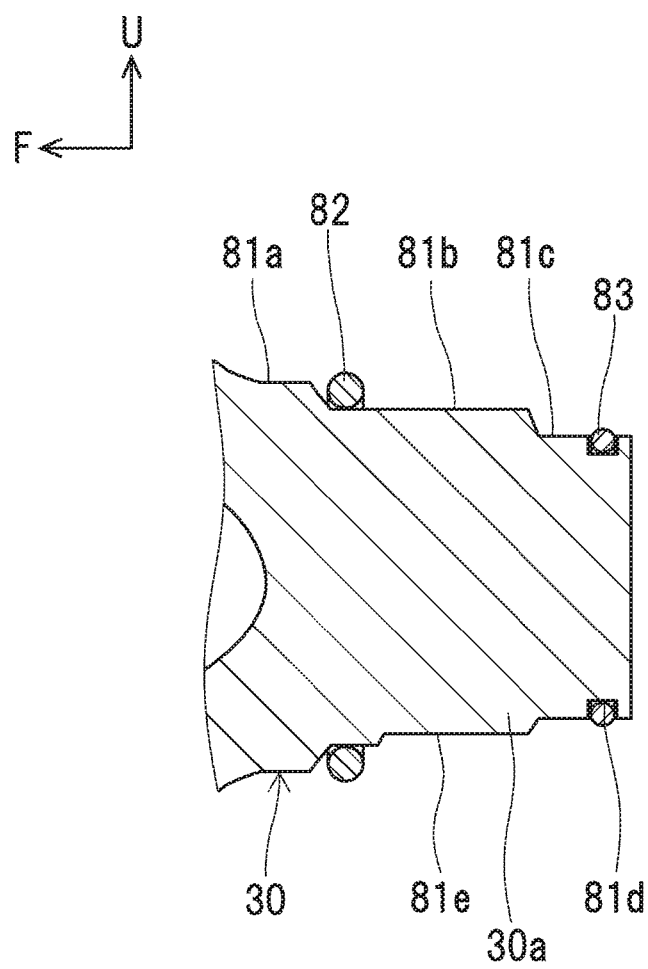
FIG. 22 is a sectional side view of a shaft part of the front axle case.

As shown in FIG. 22, in the shaft part 30a with the bearing configuration, the outer diameter gradually decreases with two steps toward the rear side. The parts having different outer diameter are formed as a large diameter part 81a, a middle diameter part 81b and a small diameter part 81c in order from the front side (the part having a large outer diameter).

As shown in FIGS. 20 and 22, the large diameter part 81a of the shaft part 30a has an outer diameter slightly smaller than the large diameter part 91a of the supporting hole 21. The length of the large diameter part 81a of the shaft part 30a in the longitudinal direction (in the axial direction) is shorter than that of the large diameter part 91a of the supporting hole 21 in the longitudinal direction (in the cylindrical axial direction).

The large diameter part 81a of the shaft part 30a is inserted into the large diameter part 91a of the supporting hole 21. At this time, the large diameter part 81a of the shaft part 30a is disposed in front of the bearing 92.

The middle diameter part 81b of the shaft part 30a has an outer diameter slightly smaller than the inner diameter of the bearing 92. The total length of the large diameter part 81a of the shaft part 30a in the longitudinal direction and the middle diameter part 81b in the longitudinal direction is as long as the length of the large diameter part 91a of the supporting hole 21 in the longitudinal direction.

The O-ring 82 is attached, as a seal member, to the front end part of the middle diameter part 81b of the shaft part 30a.

The middle diameter part 81b of the shaft part 30a is inserted into the bearing 92. The part of the middle diameter part 81b from the rear end to the middle is supported by the bearing 92.

At this time, the O-ring 82 is disposed in front of the bearing 92, and seals a gap between the large diameter part 91a of the supporting hole 21 and the middle diameter part 81b of the shaft part 30a.

The small diameter part 81c of the shaft part 30a has an outer diameter slightly smaller than the middle diameter part 91b of the supporting hole 21. The length of the small diameter part 81c of the shaft part 30a in the longitudinal direction is slightly longer than the length of the middle diameter part 91b of the supporting hole 21 in the longitudinal direction.

An O-ring groove 81d is formed on the middle part of the small diameter part 81c along the circumferential direction of the small diameter part 81c.

O-ring 83 is attached, as a seal member, to the O-ring groove 81d.

In this way, the shaft part 30a of the present embodiment corresponds to a shaft where two O-rings 82 and 83 are attached at a prescribed interval in the axial direction (the longitudinal direction).

The small diameter part 81c of the shaft part 30a is inserted into the small diameter part 91c of the supporting hole 21 such that the rear side part of the small diameter part 81c comes in contact with the step face formed between the middle diameter part 91b and the small diameter part 91c of the supporting hole 21.

At this time, the O-ring 83 is disposed behind the bearing 92, and seals a gap between the large diameter part 91b of the supporting hole 21 and the middle diameter part 81c of the shaft part 30a.

In this way, in the bearing configuration, the shaft part 30a is inserted into the bearing 92, and the gaps between the supporting hole 21 and the shaft part 30a at the both front and rear sides of the bearing 92 (both sides in the axial direction) are sealed by the O-rings 82 and 83.

A notch 81e is formed on the shaft part 30a with the bearing configuration of the present embodiment.

Figure 23:
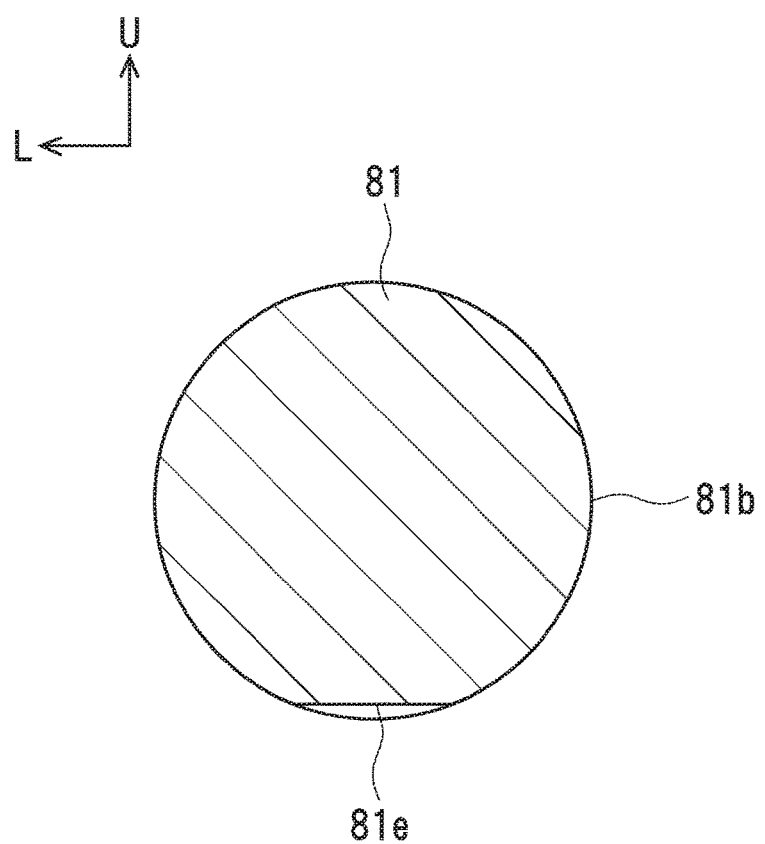
FIG. 23 is a sectional front view of a notch.

As shown in FIG. 23, the notch 81e is formed on the bottom part, that is the side face on the lower side, of the middle diameter part 81b. The notch 81e is formed so as to linearly notch the bottom part of the middle diameter part 81b in the front sectional view.

As shown in FIGS. 20 and 22, the notch 81e is continuously formed from the rear end part of the middle diameter part 81b to the vicinity of the front-side O-ring 82.

As shown in FIGS. 20, in the state where the shaft part 30a is inserted into the supporting hole 21, the front end part of the notch 81e is disposed in front of the bearing 92. At this time, the rear end part of the notch 81e is disposed on the same position as the rear end part of the bearing 92 in the longitudinal direction.

That is, in the state where the gap is formed between the notch 81e and the inner peripheral surface of the bearing 92, the middle diameter part 81b of the shaft part 30a is supported by the bearing 92.

The flow until supporting the shaft part 30a using the bearing configuration is described.

The positions in the vertical direction and so on, the front axle bracket 13 and front axle case 30 are previously aligned with a jig and so on.

Figure 24:
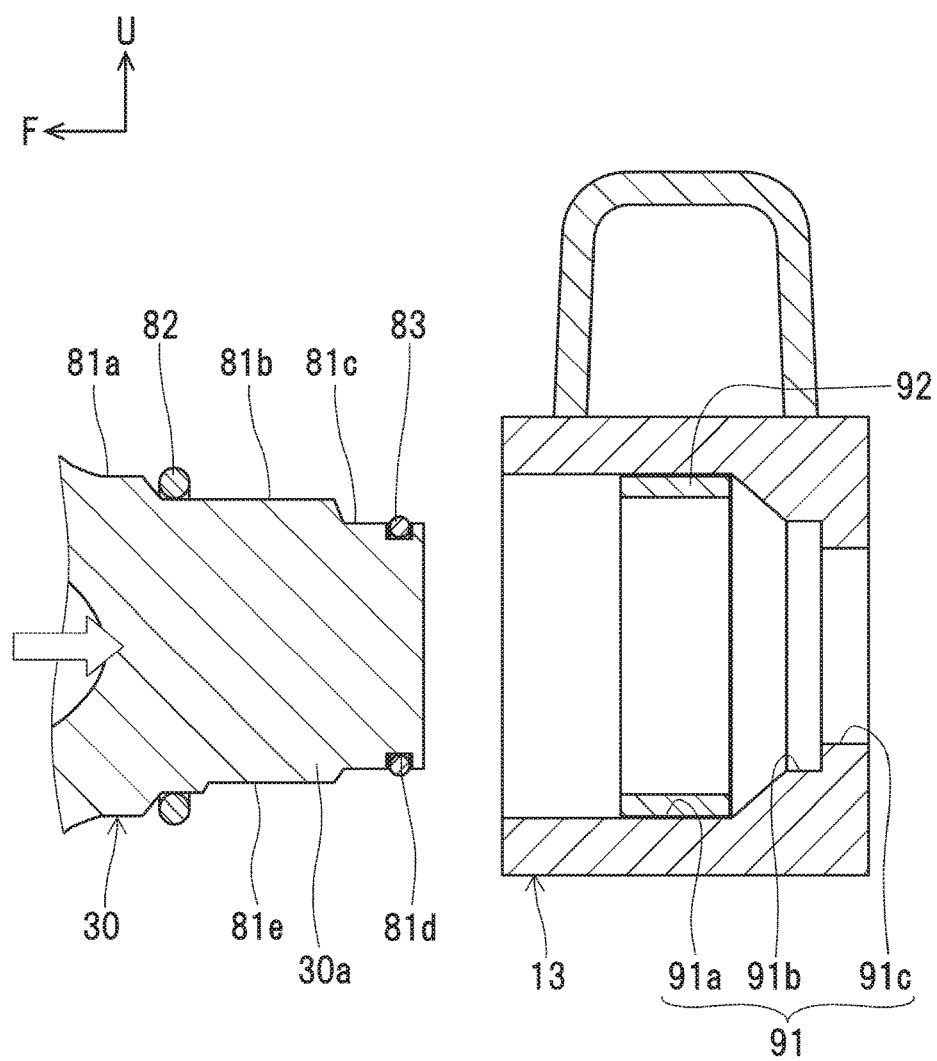
FIG. 24 is a sectional view showing a state where the front axle case is inserted into the front axle bracket.
Figure 25A:
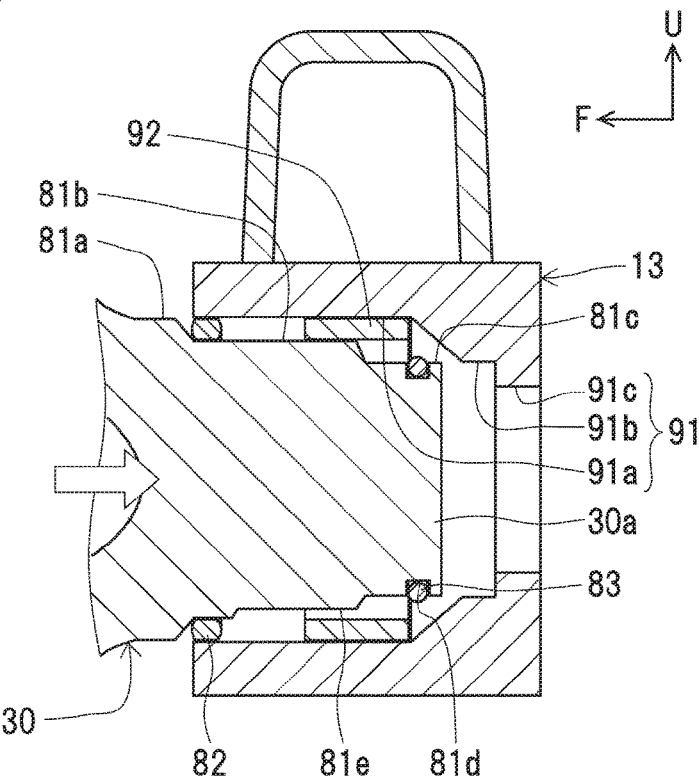
FIG. 25(a) is a sectional side view and FIG. 25(b) is an enlarged view.

As shown in FIGS. 24 and 25(a), in the bearing configuration, the shaft part 30a is brought close to the supporting hole 21, and the shaft part 30a is inserted into the front side of the supporting hole 21 (see the arrow shown in FIG. 24).

Figure 25B:
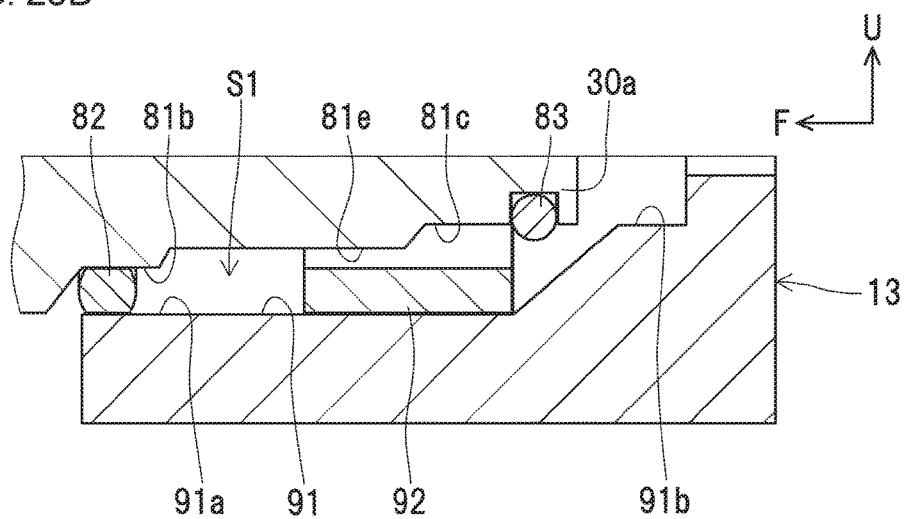

At this time, as shown in FIG. 25, the front-side O-ring 82 deforms between the large diameter part 91a of the supporting hole 21 and the middle diameter part 81b of the shaft part 30a. Therefore, the front-side O-ring 82 seals the gap between the large diameter part 91a of the supporting hole 21 and the middle diameter part 81b of the shaft part 30a That is, the front-side O-ring 82 seals the gap in front of the bearing 92.

The rear end part of the middle diameter part 81b of the shaft part 30a comes in contact with the middle part of the bearing 92.

Therefore, when the front-side O-ring 82 seals the gap in front of the bearing 92, a first space S1 is formed between the front-side (one side) O-ring 82 and the bearing 92 in the gap between the supporting hole 21 and the shaft part 30a.

The first space S1 is a space in the supporting hole 21 such that the front end part thereof is formed by the front-side O-ring 82 and the rear end part thereof is formed by the front end part side of the bearing 92.

When the first space S1 is formed, the front end part of the notch 81e is disposed in front of the bearing 92.

Therefore, in the state shown in FIG. 25, the first space S1 is connected to a space behind the bearing 92 through the notch 81e. That is, the first space S1 is opened to the outside.

In this way, in the shaft part 30a, a connecting passage S is formed which connects the first space S1 to the space behind the bearing 92.

Figure 26A:
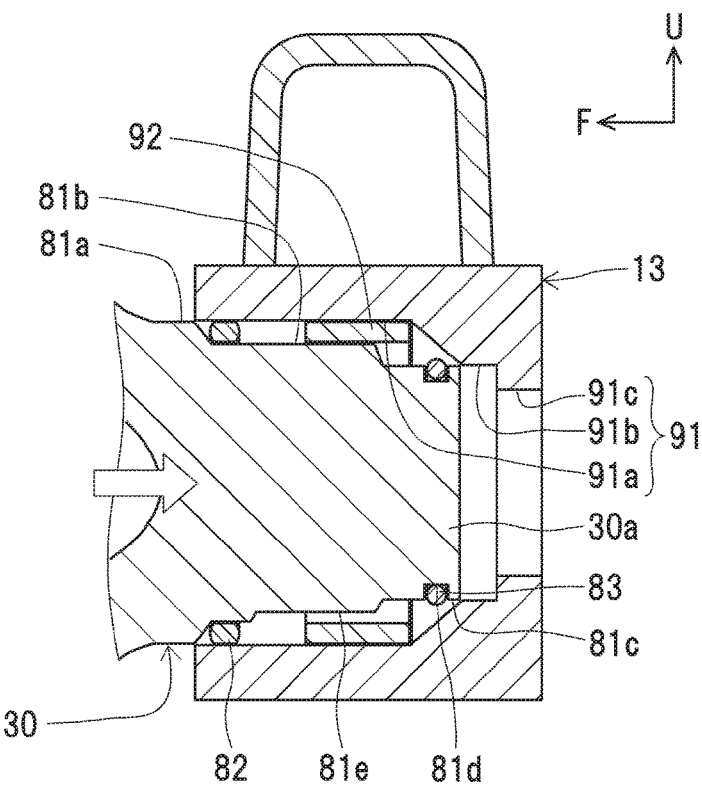
FIG. 26(a) is a sectional side view and FIG. 26(b) is an enlarged view.

As shown in FIGS. 25 and 26(a), in the bearing configuration, even after the first space S1 is formed, insertion operation of the shaft part 30a is continued (see the arrow shown in FIG. 25(a)).

Figure 26B:
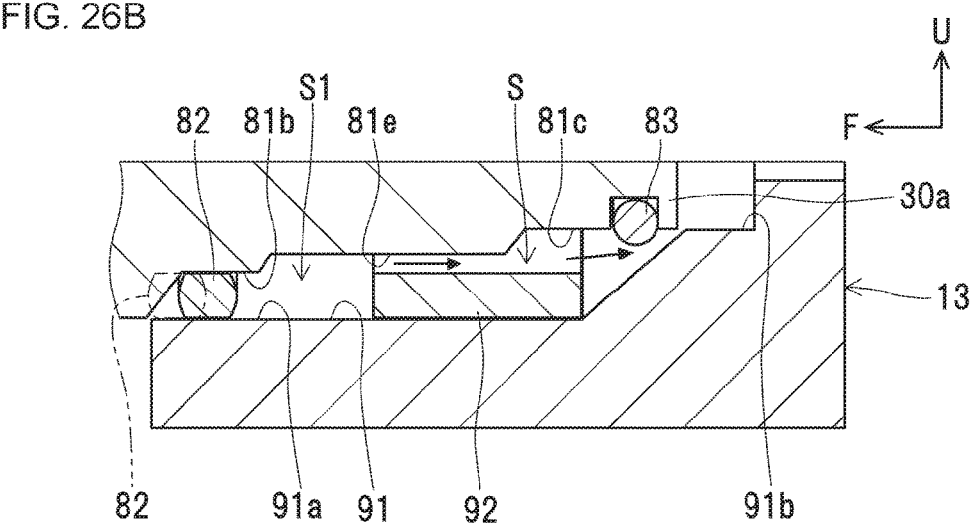

As shown in FIG. 26, by the insertion operation of the shaft part 30a, the front-side O-ring 82 is brought close to the bearing 92, and the capacity of the O-ring 82 decreases (see the front-side O-ring 82 indicated by a two-dot chain line in FIG. 26(b)).

For this reason, for example, if the notch is not formed on the shaft part and the first space is formed as a closed space, air in the first space is compressed.

Therefore, in this case, the first space is pressed, and thereby power required for inserting the shaft part increases according to the insertion operation of the shaft part.

Accordingly, in the bearing configuration of the present embodiment, the connecting passage S is formed on the shaft part 30a. Therefore, when the capacity of the first space S1 decreases by the insertion operation of the shaft part 30a, the air in the first space S1 is released to the outside through the connecting passage S (see the arrows shown in FIG. 26(b)).

Thereby, in the bearing configuration, the shaft part 30a can be inserted without the air in the first space S1 being compressed, which prevents increase in power required for inserting the shaft part.

Figure 27A:
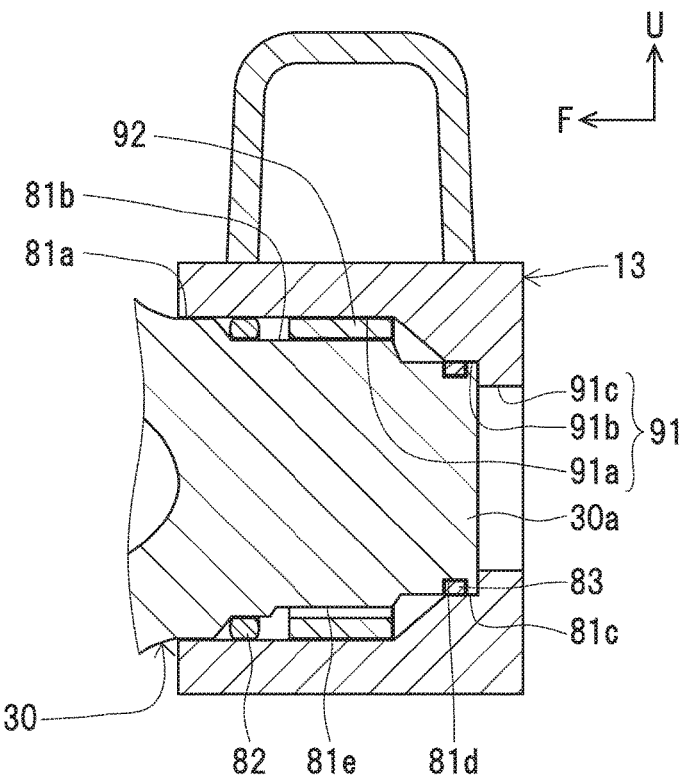
FIG. 27(a) is a sectional side view and FIG. 27(b) is an enlarged view.
Figure 27B:
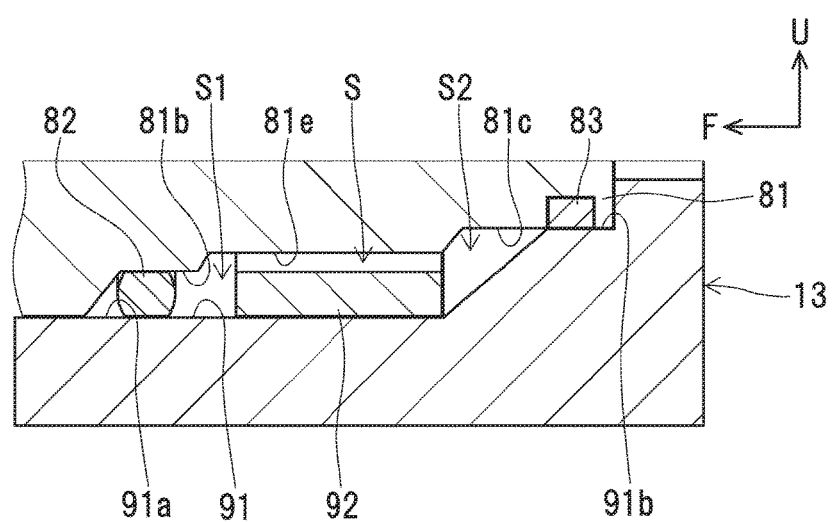

As shown in FIGS. 26 and 27, in the bearing configuration, the shaft part 30a is inserted such that the rear end part of the shaft 30a comes in contact with the step face formed between the middle diameter part 91b and the small diameter part 91c of the supporting hole 21 (see the arrow shown in FIG. 26(a)). Thereby, in the bearing configuration, the insertion operation of the shaft part 30a is finished.

At this time, as shown in FIG. 27, the rear-side O-ring 83 deforms between the middle diameter part 91b of the supporting hole 21 and the small diameter part 81c of the shaft part 30a. Therefore, the rear-side O-ring 83 seals the gap between the middle diameter part 91b of the supporting hole 21 and the small diameter part 81c of the shaft part 30a. That is, the rear-side O-ring 83 seals the gap behind the bearing 92.

Thereby, a second space S2 is formed between the rear-side (the other side) O-ring 83 and the bearing 92 in the gap between the supporting hole 21 and the shaft part 30a.

The second space S2 is a space in the supporting hole 21 such that the front end part thereof is formed by the rear end part side of the bearing 92 and the rear end part thereof is formed by the rear-side O-ring 83.

When the second space S2 is formed, the front end part of the notch 81e is disposed in front of the bearing 92.

Therefore, in the state shown in FIG. 27, the first space S1 and the second space S2 are connected to each other through the connecting passage S.

That is, the first space S1 and the second space S2 are not formed as two closed spaces across the bearing 92, but are formed as one closed space through the connecting passage S.

In this way, in the shaft part 30a of the present embodiment, the connecting passage S is formed which connects the first space S1 to the second space S2.

By forming the connecting passage S, in the bearing configuration, the first space S1 and the second space S2 are always connected to each other after the second space S2 is formed until the insertion operation of the shaft part 30a is finished.

Therefore, in the bearing configuration, until the insertion operation of the shaft part 30a is finished after the second space S2 is formed, the air in the first space S1, the second space S2 and the connecting passage S is compressed.

Thereby, in the bearing configuration, the capacity of the space where the air is compressed can be expanded compared with the case where the first space S1 and the second space S2 are formed as closed spaces, so that compression rate of air can be decreased.

Therefore, in the bearing configuration, the power required for inserting the shaft part 30a does not significantly increase by compressing the air in only the first space S1. Therefore, the rear end part of the shaft part 30a can be prevented from being unable to come in contact with the step between the middle diameter part 91b and the small diameter part 91c of the supporting hole 21.

That is, in the bearing configuration, the shaft part 30a can surely be inserted into the supporting hole 21.

The load from a heavy member (for example, the engine 2) on the base frame 10 acts on the top part of the shaft part 30a supported by the bearing 92 (see FIGS. 1 and 2).

Accordingly, in the bearing configuration of the present embodiment, the notch 81e, as the connecting passage S, is formed on the bottom part of the middle diameter part 81b of the shaft part 30a, that is, the side face of the notch 81e on the counter-load side (the lower side).

Thereby, in the bearing configuration, the load from the heavy member on the base frame 10 does not directly act on the notch 81e. Therefore, in the bearing configuration, rigidity of the shaft part 30a can be secured.

In the bearing configuration, the connecting passage S can be easily formed which connects the first space S1 to the second space S2.

In the working vehicle 1, the front axle case 21 is supported using the bearing configuration. Therefore, mud and so on can be prevented from entering the front axle case 21, and the front axle case 21 can be easily attached to the front axle bracket 13.

In particular, in the working vehicle 1, if maintenance is performed in the environment where the working vehicle 1 is hardly taken to pieces completely, or if it is difficult to confirm whether the shaft part 30a can be surely inserted into the supporting hole 21, the front axle case 21 can be surely attached to the front axle bracket 13.

Figure 28A:
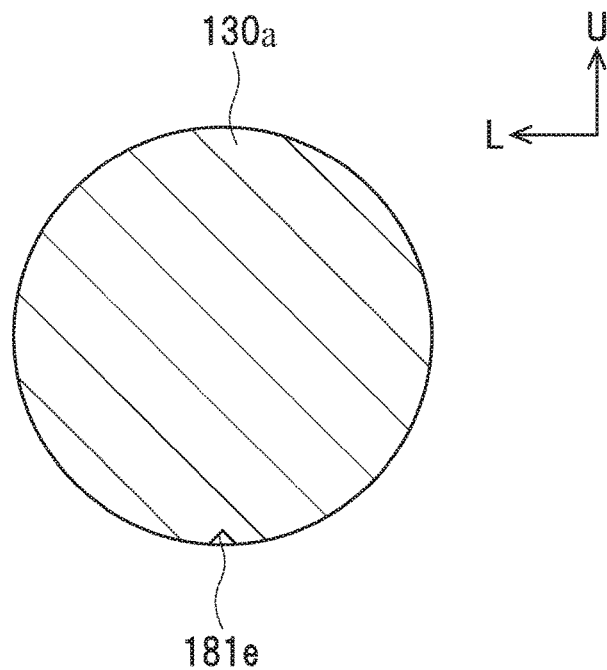
FIG. 28(a) is a view showing the notch formed in V-shape in cross section and FIG. 28(b) is a view showing the notch formed in U-shape in cross section.
Figure 28B:
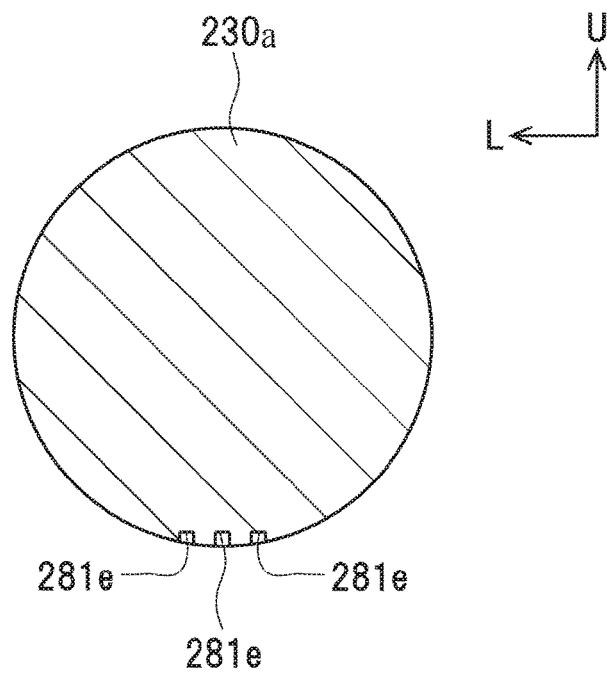

Note that the form of the notch, that is, the form of the connecting passage is not limited to the present embodiment. For example, the notch may be formed in a V-shape in the cross section as with a notch 181e of a shaft part 130a shown in FIG. 28(a). For example, the notch may be formed in a U-shape in the cross section as with a notch 281e of a shaft part 230a shown in FIG. 28(b).

The number of the formed notch, that is, the number of the connecting passage is not limited to the present embodiment. A plurality of notches may be formed as with notches 281e shown in FIG. 28(b).

The bearing configuration of another embodiment is described.

The bearing configuration of another embodiment differs from the bearing configuration of the present embodiment in that a connecting passage S10 is formed on the inside of a shaft part 330a.

For this reason, only a part associated with the connecting passage S10 is described below. The other parts are indicated by the same reference characters as the present embodiment, and the description for other parts is omitted.

Figure 29A:
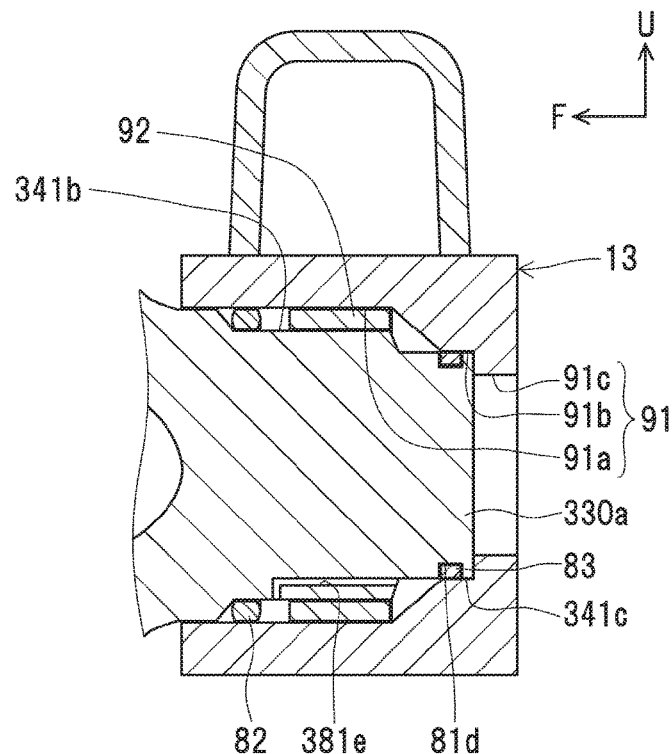
FIG. 29(a) is a sectional side view and FIG. 29(b) is an enlarged view.
Figure 29B:
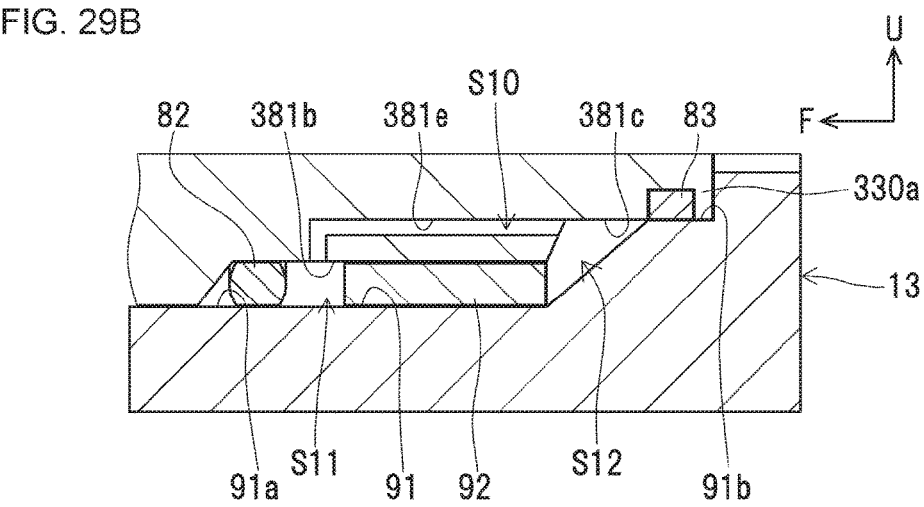

As shown in FIG. 29, a middle diameter part 381b formed in a substantially cylindrical shape is formed on the shaft part 330a of another embodiment. A hole part 381e is formed in the shaft part 330a. One side of the hole part 381e is opened at the front part of the middle diameter part 381b, and the other side of the hole part 381e is opened at the front end part of the small diameter part 381c.

The hole part 381e is extended from a front-side opening part to the inside of the shaft part 330a in the radial direction, and then is extended to the rear side. Therefore, the hole part 381e is opened to the outside on the taper face between the middle diameter part 81b and the small diameter part 81c of the shaft part 330a.

The front-side opening part of the hole part 381e is formed behind the front-side O-ring 82, and is disposed on the outer peripheral surface forming the first space S11 of the middle diameter part 381b of the shaft part 330a when the first space S11 is formed.

The rear-side opening part of the hole part 381e is formed in front of the rear-side O-ring 83, and is disposed on the outer peripheral surface forming the second space S12 of the small diameter part 381c of the shaft part 330a when the second space S12 is formed.

In the bearing configuration of another embodiment, the connecting passage S10 is formed which connects the first space S11 to a space (the second space S2) behind the bearing 92.

Thereby, in the bearing configuration of another embodiment, in the insertion operation of the shaft part 30a until the second space S2 is formed, the air in the first space S11 is released to the outside. In the bearing configuration of another embodiment, in the insertion operation of the shaft part 30a after the second space S2 is formed, compression rate of air is decreased.

Thereby, in the bearing configuration of another embodiment, the shaft part 330a can surely be inserted into the supporting hole 21.

In the bearing configuration of another embodiment, it is not necessary to form the connecting passage S10 or to insert the shaft part 330a taking into account the position where the load from the heavy member on the base frame 10 acts, that is, a phase of the shaft part 330a.

For this reason, in the bearing configuration of another embodiment, the shaft part 330a can easily be inserted into the supporting hole 21.

In this way, in the bearing configuration of another embodiment, the hole part 381e is formed as the connecting passage S10 which connects the part forming the first space S11 of the outer peripheral surface of the shaft part 330a to the part forming the second space S12 of the outer peripheral surface of the shaft part 330a.

INDUSTRIAL APPLICABILITY

The present invention is applicable to a working vehicle where a front axle case is supported by two front axle brackets.

REFERENCE SIGNS LIST

1: working vehicle
10: body frame
11: beam
12: reinforced plate
13: front axle bracket
14a: first attaching hole
14b: second attaching hole
20: front hitch
20a: bent part
21: front axle bracket
30: front axle case
30a: shaft part
40: transmission case
61: first pin
72: second pin
82: O-ring (seal member)
83: O-ring (seal member)
92: bearing
S: connecting passage
S1: first space
S2: second space

The invention claimed is:
1. A working vehicle where a front axle case is supported by two front axle brackets, comprising:
a body frame formed by disposing beams at a prescribed interval, by welding reinforced plates provided for receiving load by the front axle brackets to plate faces of the beams which face to each other, and by welding both end parts of one of the front axle brackets to the reinforced plates; and
a front hitch formed by welding both end parts of the other front axle bracket directly to both end parts of a plate member which are bent;
wherein the front hitch is attached to the body frame such that the two front axle brackets are opposed to each other;
wherein the front axle case is supported by penetrating a shaft part of the front axle case to a support hole of the front axle bracket;
wherein the shaft part of the front axle case is monolithically formed with the front axle case.
2. The working vehicle according to claim 1, wherein end parts of the reinforced plates are extended to an end part of the body frame, and
the front hitch is attached to the body frame through extended end parts of the reinforced plates.

3. The working vehicle according to claim 2, wherein
a transmission case is fixed on the inside of the beams, by first pins and second pins, which are disposed at a prescribed interval,
a first attaching hole where the first pin is closely inserted and a second attaching hole where the second pin is loosely inserted are formed on each of the beams,
the first pin inserted into the first attaching hole is fixed to the transmission case, and
the second pin inserted into the second attaching hold is fixed to the transmission case and each of the beams.

4. The working vehicle according to claim 1, wherein
a transmission case is fixed on the inside of the beams, by first pins and second pins, which are disposed at a prescribed interval,
a first attaching hole where the first pin is closely inserted and a second attaching hole where the second pin is loosely inserted are formed on each of the beams,
the first pin inserted into the first attaching hole is fixed to the transmission case, and
the second pin inserted into the second attaching hold is fixed to the transmission case and each of the beams.

5. The working vehicle according to claim 4, wherein
the second attaching hold is formed in a circular arch shape centered about the first pin.

6. The working vehicle according to claim 4, wherein
the second attaching hold is formed in a circular arch shape centered about the first pin.

7. A working vehicle where a front axle case is supported by two front axle brackets, comprising:
a body frame comprising beams spaced apart at a prescribed interval based on reinforcement plates welded to plate faces of the beams which face to each other, and based on both end parts of one of the front axle brackets welded to the reinforcement plates; and
a front hitch comprising a plate member which is bent and has each of a first end and a second end welded directly to corresponding end parts of the other front axle bracket;
wherein the front hitch is attached to the body frame such that the two front axle brackets are opposed to each other.

8. A working vehicle comprising:
a front axle case;
a first front axle bracket and a second front axle bracket coupled to the front axle case, the first front axle bracket opposed to the second front axle bracket;
a body frame comprising a first beam and a second beam;
a first reinforcement plate coupled to the first beam;
a second reinforcement plate coupled to the second beam; and
a front hitch comprising a bent plate member having a first end coupled to the first beam and a second end coupled to the second beam;
wherein:
the first front axle bracket is directly coupled to the first reinforcement plate and to the second reinforcement plate; and
the second front axle bracket is directly coupled to the first end of the front hitch and to the second end of the front hitch.

9. The working vehicle of claim 8, wherein:
the first reinforcement plate is positioned between the first beam and a first end of the first front axle bracket;
the second reinforcement plate is positioned between the second beam and a second end of the first front axle bracket;
the first end of the front hitch is positioned between the first beam and a first end of the second front axle bracket; and
the second end of the front hitch is positioned between the second beam and a second end of the second front axle bracket.

10. The working vehicle of claim 9, wherein:
the first reinforcement plate is positioned between the first end of the front hitch and the first beam; and
the second reinforcement plate is positioned between the second end of the front hitch and the second beam.

11. The working vehicle of claim 9, further comprising:
a first bolt that extends through the first beam, the first reinforcement plate, and the first end of the front hitch; and
a second bolt that extends through the second beam, the second reinforcement plate, and the second end of the front hitch.

12. The working vehicle of claim 9, wherein:
the first reinforcement plate is welded to a plate face of the first beam;
the second reinforcement plate is welded to a plate face of the second beam;
the first end of the first front axle bracket is welded to the first reinforcement plate;
the second end of the first front axle bracket is welded to the second reinforcement plate;
the first end of the second front axle bracket is welded to the first end of the front hitch; and
the second end of the second front axle bracket is welded to the second end of the front hitch.

* * * * *